United States Patent
Tanaka et al.

(10) Patent No.: US 8,017,897 B2
(45) Date of Patent: Sep. 13, 2011

(54) IMAGE GENERATION APPARATUS, METHOD, AND RECORDING MEDIUM FOR PROJECTING A PLURALITY OF PHASE IMAGES OVERLAPPING EACH OTHER WITH A PREDETERMINED AMOUNT OF SHIFT

(75) Inventors: Kenji Tanaka, Kanagawa (JP); Tetsujiro Kondo, Tokyo (JP); Tetsushi Kokubo, Kanagawa (JP); Hitoshi Mukai, Kanagawa (JP); Hirofumi Hibi, Kanagawa (JP); Kazumasa Tanaka, Chiba (JP); Hiroyuki Morisaki, Tokyo (JP)

(73) Assignee: Sony Corporation, Tokyo (JP)

( * ) Notice: Subject to any disclaimer, the term of this patent is extended or adjusted under 35 U.S.C. 154(b) by 853 days.

(21) Appl. No.: 12/047,826

(22) Filed: Mar. 13, 2008

(65) Prior Publication Data
US 2008/0260292 A1 Oct. 23, 2008

(30) Foreign Application Priority Data

Apr. 20, 2007 (JP) ................................. 2007-111327

(51) Int. Cl.
*H01L 27/00* (2006.01)
(52) U.S. Cl. .................................... 250/208.1; 250/221
(58) Field of Classification Search ............... 250/208.1, 250/214 R, 221; 353/94, 48, 35; 345/77–89, 345/50–55
See application file for complete search history.

(56) References Cited

U.S. PATENT DOCUMENTS
7,142,185 B2 * 11/2006 Aoki ............................... 345/89

OTHER PUBLICATIONS

Will Allen, et al., "Wobulation: Doubling the Addressed Resolution of Projection Displays", Proceedings of SID, SID '05 Digest, 2005, pp. 1514-1517.
Ruigang Yang, et al., "PixelFlex: A Reconfigurable Multi-Projector Display System", IEEE Visualization 2001, 9 pages.

* cited by examiner

*Primary Examiner* — Que Le
(74) *Attorney, Agent, or Firm* — Oblon, Spivak, McClelland, Maier & Neustadt, L.L.P.

(57) ABSTRACT

An image generation apparatus for generating, from an input image, a plurality of phase images having lower resolutions than the input image and overlapping each other with a predetermined amount of shift when being projected onto a projection plane. The apparatus includes when the plurality of phase images are projected onto the projection plane, means for relating an area formed by a predetermined pixel of the plurality of phase images overlapping individually to a predetermined pixel of the input image, and calculating a pixel value of a pixel of the phase images having a smallest difference between a pixel value of the corresponding area and a pixel value of a pixel of the input image.

9 Claims, 35 Drawing Sheets

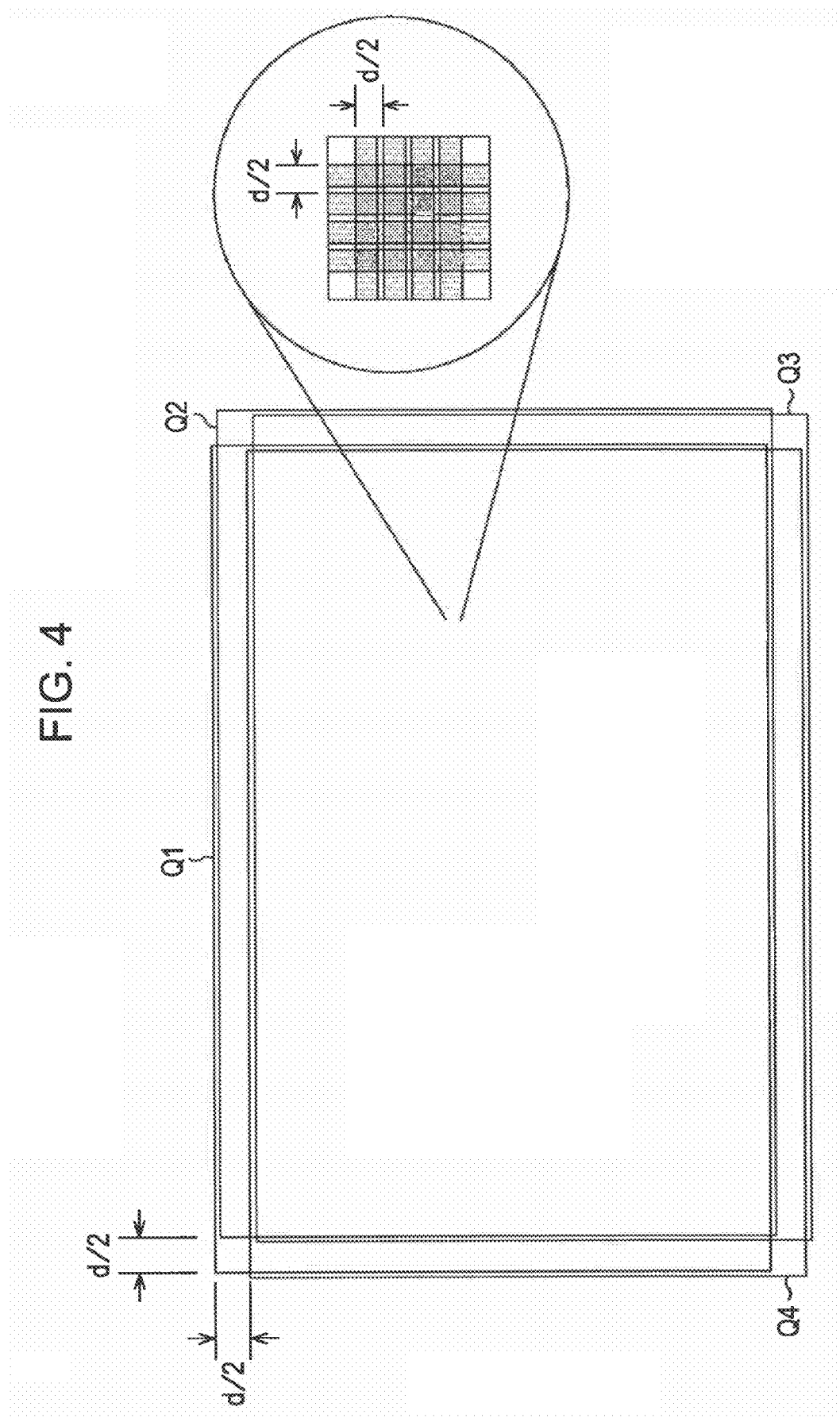

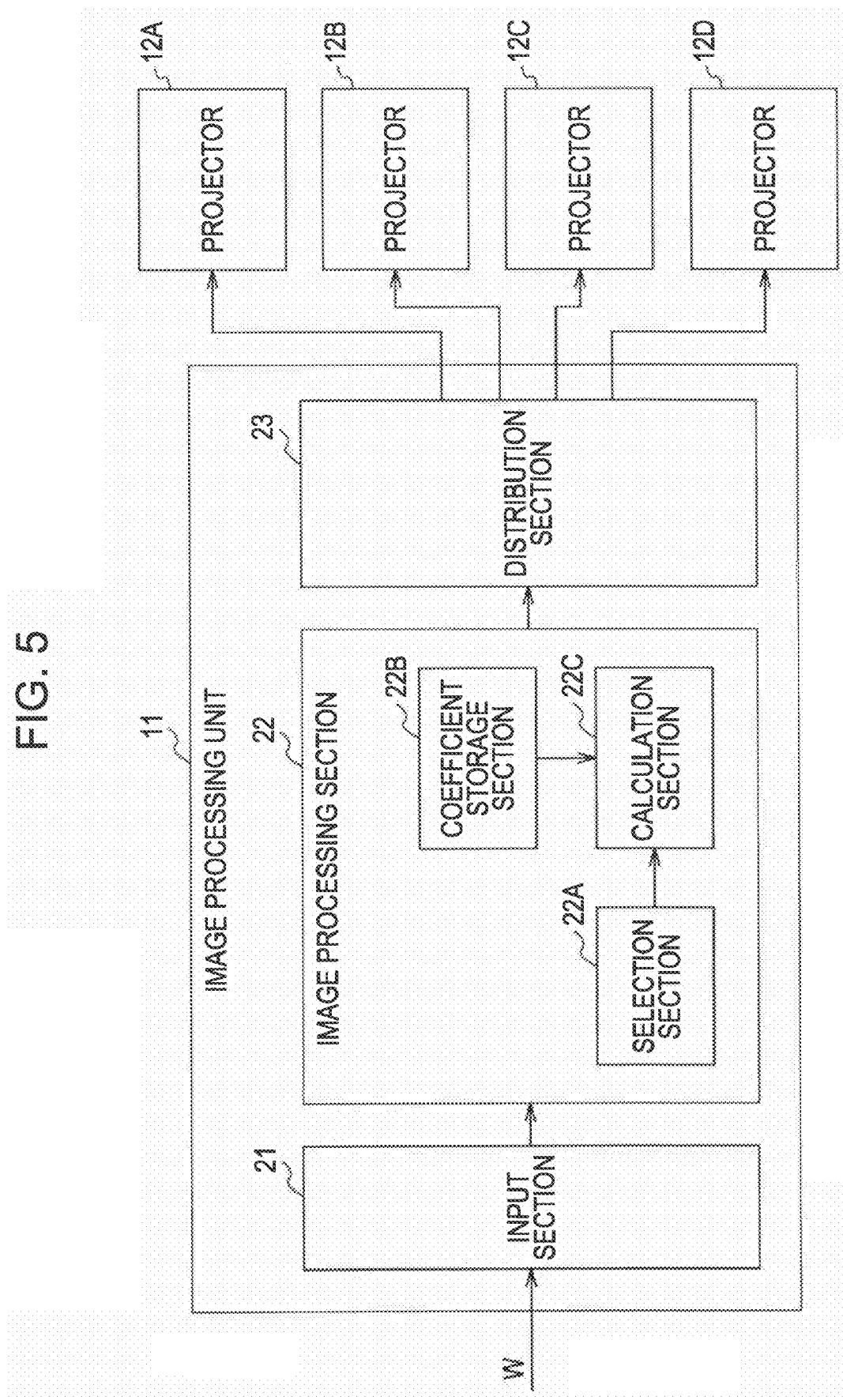

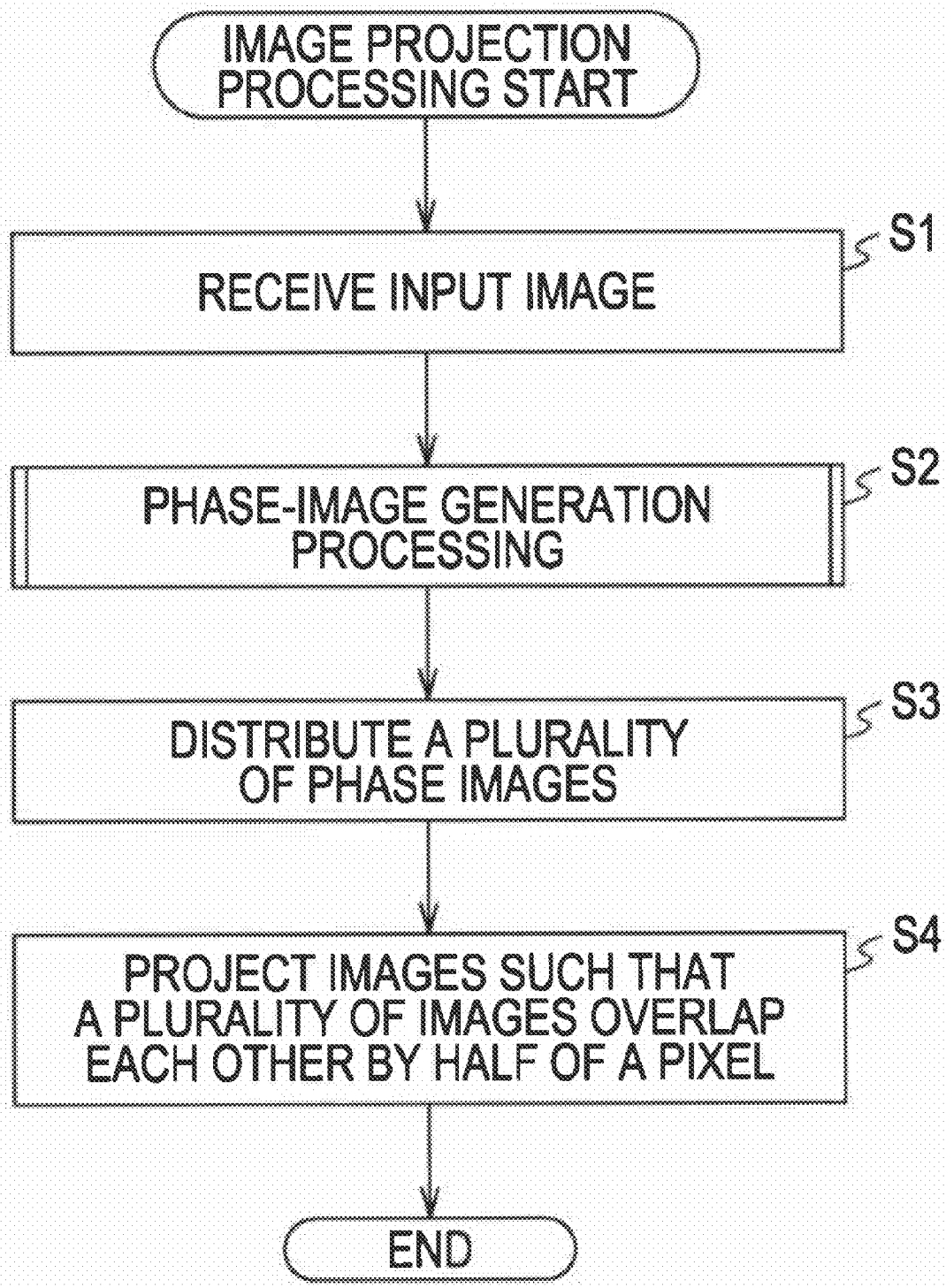

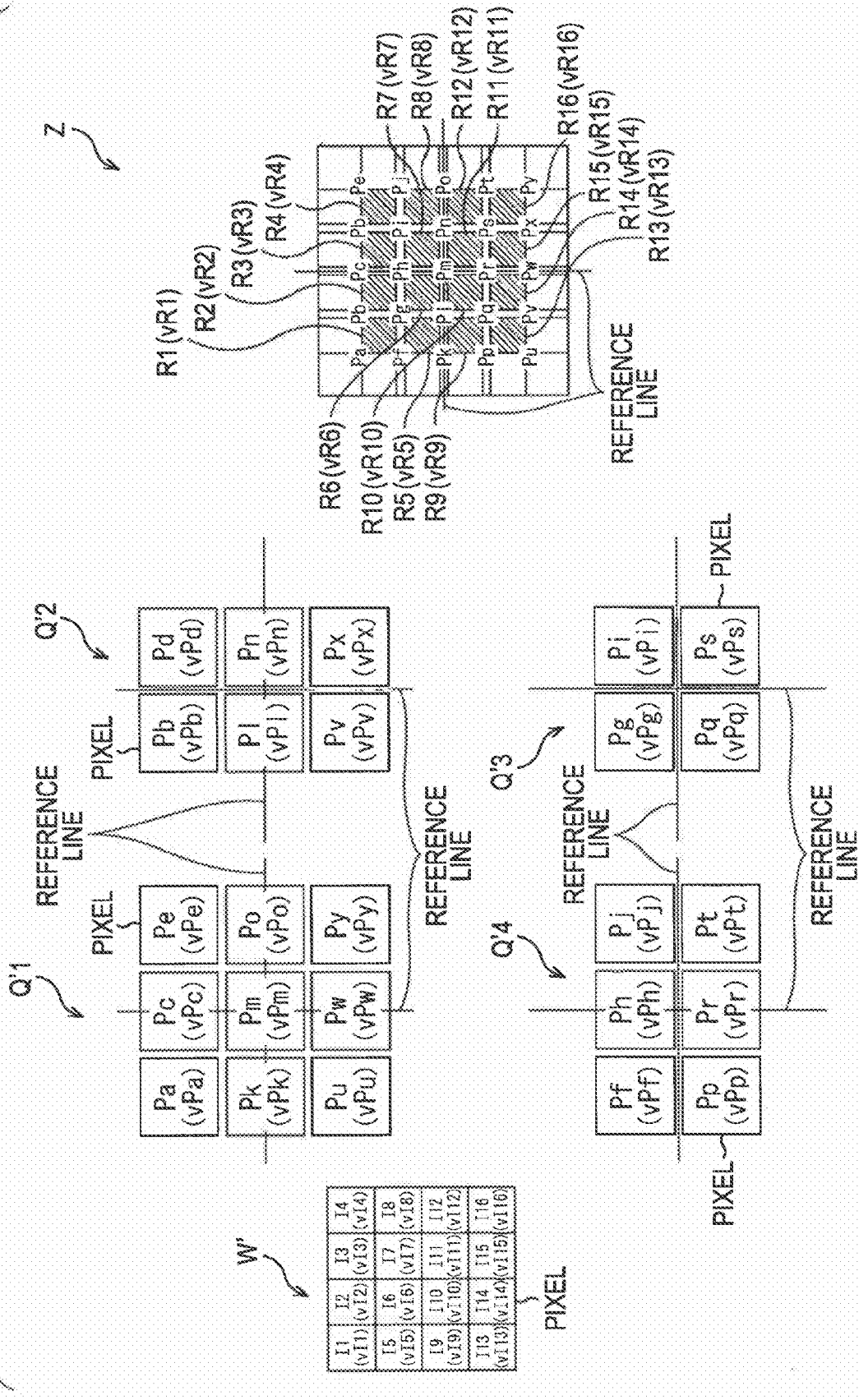

$$(vPa\ vPb\ vPc\ vPd\ vPe\ vPf\ vPg\ vPh\ vPi\ vPj\ vPk\ vPl\ vPm\ vPn\ vPo\ vPp\ vPq\ vPr\ vPs\ vPt\ vPu\ vPv\ vPw\ vPx\ vPy)$$

$$\cdot$$

$$\begin{pmatrix}
0 & 0 & 0 & 0 & 0 & 0 & 0 & 0 & 0 & 0 & 0 & 0 & 0 & 0 & 1 & 1 \\
0 & 0 & 0 & 0 & 0 & 0 & 0 & 0 & 0 & 0 & 0 & 0 & 0 & 1 & 1 & 0 \\
0 & 0 & 0 & 0 & 0 & 0 & 0 & 0 & 0 & 0 & 0 & 0 & 1 & 1 & 0 & 1 \\
0 & 0 & 0 & 0 & 0 & 0 & 0 & 0 & 0 & 0 & 0 & 1 & 1 & 0 & 1 & 0 \\
0 & 0 & 0 & 0 & 0 & 0 & 0 & 0 & 0 & 0 & 1 & 1 & 0 & 0 & 0 & 0 \\
0 & 0 & 0 & 0 & 0 & 0 & 0 & 0 & 0 & 1 & 1 & 0 & 0 & 0 & 0 & 1 \\
0 & 0 & 0 & 0 & 0 & 0 & 0 & 0 & 1 & 1 & 0 & 1 & 0 & 0 & 1 & 1 \\
0 & 0 & 0 & 0 & 0 & 0 & 0 & 1 & 1 & 0 & 0 & 1 & 1 & 1 & 0 & 0 \\
0 & 0 & 0 & 0 & 0 & 0 & 1 & 1 & 0 & 0 & 1 & 1 & 0 & 0 & 0 & 0 \\
0 & 0 & 0 & 0 & 0 & 1 & 0 & 0 & 0 & 1 & 0 & 0 & 0 & 0 & 0 & 0 \\
0 & 0 & 0 & 0 & 0 & 1 & 1 & 0 & 0 & 1 & 0 & 0 & 0 & 0 & 0 & 0 \\
0 & 0 & 0 & 0 & 1 & 1 & 0 & 0 & 1 & 1 & 0 & 0 & 0 & 0 & 0 & 0 \\
0 & 0 & 0 & 1 & 1 & 0 & 0 & 1 & 1 & 0 & 0 & 0 & 0 & 0 & 0 & 0 \\
0 & 0 & 0 & 1 & 0 & 0 & 0 & 1 & 0 & 0 & 0 & 0 & 0 & 0 & 0 & 0 \\
0 & 0 & 1 & 1 & 0 & 0 & 1 & 1 & 0 & 0 & 0 & 0 & 0 & 0 & 0 & 0 \\
0 & 1 & 1 & 0 & 0 & 1 & 1 & 0 & 0 & 0 & 0 & 0 & 0 & 0 & 0 & 0 \\
1 & 1 & 0 & 0 & 1 & 1 & 0 & 0 & 0 & 0 & 0 & 0 & 0 & 0 & 0 & 0 \\
1 & 0 & 0 & 0 & 1 & 0 & 0 & 0 & 0 & 0 & 0 & 0 & 0 & 0 & 0 & 0 \\
0 & 0 & 0 & 1 & 0 & 0 & 0 & 0 & 0 & 0 & 0 & 0 & 0 & 0 & 0 & 0 \\
0 & 0 & 1 & 1 & 0 & 0 & 0 & 0 & 0 & 0 & 0 & 0 & 0 & 0 & 0 & 0 \\
0 & 1 & 1 & 0 & 0 & 0 & 0 & 0 & 0 & 0 & 0 & 0 & 0 & 0 & 0 & 0 \\
1 & 1 & 0 & 0 & 0 & 0 & 0 & 0 & 0 & 0 & 0 & 0 & 0 & 0 & 0 & 0 \\
1 & 0 & 0 & 0 & 0 & 0 & 0 & 0 & 0 & 0 & 0 & 0 & 0 & 0 & 0 & 0
\end{pmatrix}$$

FIG. 9

$$
\begin{pmatrix} vI1 & vI2 & vI3 & vI4 & vI5 & vI6 & vI7 & vI8 & vI9 & vI10 & vI11 & vI12 & vI13 & vI14 & vI15 & vI16 \end{pmatrix}
$$

$$=$$

$$
\begin{pmatrix} vPa & vPb & vPc & vPd & vPe & vPf & vPg & vPh & vPi & vPj & vPk & vPl & vPm & vPn & vPo & vPp & vPq & vPr & vPs & vPt & vPu & vPv & vPw & vPx & vPy \end{pmatrix}
$$

$\cdot$ $$
\begin{pmatrix}
0 & 0 & 0 & 0 & 0 & 0 & 0 & 0 & 0 & 0 & 0 & 0 & 0 & 0 & 0 & 1 \\
0 & 0 & 0 & 0 & 0 & 0 & 0 & 0 & 0 & 0 & 0 & 0 & 0 & 0 & 1 & 1 \\
0 & 0 & 0 & 0 & 0 & 0 & 0 & 0 & 0 & 0 & 0 & 0 & 0 & 1 & 1 & 0 \\
0 & 0 & 0 & 0 & 0 & 0 & 0 & 0 & 0 & 0 & 0 & 0 & 1 & 1 & 0 & 0 \\
0 & 0 & 0 & 0 & 0 & 0 & 0 & 0 & 0 & 0 & 0 & 1 & 0 & 0 & 0 & 0 \\
0 & 0 & 0 & 0 & 0 & 0 & 0 & 0 & 0 & 0 & 1 & 0 & 0 & 0 & 0 & 0 \\
0 & 0 & 0 & 0 & 0 & 0 & 0 & 0 & 0 & 1 & 1 & 0 & 1 & 0 & 1 & 1 \\
0 & 0 & 0 & 0 & 0 & 0 & 0 & 0 & 1 & 1 & 0 & 0 & 1 & 1 & 1 & 0 \\
0 & 0 & 0 & 0 & 0 & 0 & 0 & 0 & 1 & 1 & 0 & 0 & 1 & 1 & 0 & 0 \\
0 & 0 & 0 & 0 & 0 & 0 & 0 & 1 & 0 & 0 & 0 & 1 & 0 & 0 & 0 & 0 \\
0 & 0 & 0 & 0 & 0 & 0 & 0 & 1 & 0 & 0 & 0 & 1 & 0 & 0 & 0 & 0 \\
0 & 0 & 0 & 0 & 0 & 0 & 1 & 1 & 0 & 0 & 1 & 1 & 0 & 0 & 0 & 0 \\
0 & 0 & 0 & 0 & 0 & 1 & 1 & 0 & 0 & 1 & 1 & 0 & 0 & 0 & 0 & 0 \\
0 & 0 & 0 & 0 & 1 & 1 & 0 & 0 & 1 & 1 & 0 & 0 & 0 & 0 & 0 & 0 \\
0 & 0 & 0 & 0 & 1 & 0 & 0 & 0 & 1 & 0 & 0 & 0 & 0 & 0 & 0 & 0 \\
0 & 0 & 0 & 1 & 0 & 0 & 0 & 1 & 0 & 0 & 0 & 0 & 0 & 0 & 0 & 0 \\
0 & 0 & 1 & 1 & 0 & 0 & 1 & 1 & 0 & 0 & 0 & 0 & 0 & 0 & 0 & 0 \\
0 & 1 & 1 & 0 & 0 & 1 & 1 & 0 & 0 & 0 & 0 & 0 & 0 & 0 & 0 & 0 \\
1 & 1 & 0 & 0 & 1 & 1 & 0 & 0 & 0 & 0 & 0 & 0 & 0 & 0 & 0 & 0 \\
1 & 0 & 0 & 0 & 1 & 0 & 0 & 0 & 0 & 0 & 0 & 0 & 0 & 0 & 0 & 0 \\
0 & 0 & 0 & 1 & 0 & 0 & 0 & 0 & 0 & 0 & 0 & 0 & 0 & 0 & 0 & 0 \\
0 & 0 & 1 & 1 & 0 & 0 & 0 & 0 & 0 & 0 & 0 & 0 & 0 & 0 & 0 & 0 \\
0 & 1 & 1 & 0 & 0 & 0 & 0 & 0 & 0 & 0 & 0 & 0 & 0 & 0 & 0 & 0 \\
1 & 1 & 0 & 0 & 0 & 0 & 0 & 0 & 0 & 0 & 0 & 0 & 0 & 0 & 0 & 0 \\
1 & 0 & 0 & 0 & 0 & 0 & 0 & 0 & 0 & 0 & 0 & 0 & 0 & 0 & 0 & 0 \\
\end{pmatrix}
$$

| I1 (0.04) | I2 (−0.08) | I3 (−0.08) | I4 (0.04) |
| I5 (−0.08) | I6 (0.16) | I7 (0.16) | I8 (−0.08) |
| I9 (−0.08) | I10 (0.16) | I11 (0.16) | I12 (−0.08) |
| I13 (0.04) | I14 (−0.08) | I15 (−0.08) | I16 (0.04) |

FIG. 27

$$\begin{pmatrix} 1 & 0 & 0 & 1 & 0 & 0 & 0 & 0 & 0 & 0 & 0 & 0 & 0 \\ 0 & 1 & 0 & 1 & 0 & 0 & 0 & 0 & 0 & 0 & 0 & 0 & 0 \\ 0 & 1 & 0 & 0 & 1 & 0 & 0 & 0 & 0 & 0 & 0 & 0 & 0 \\ 0 & 0 & 1 & 0 & 1 & 0 & 0 & 0 & 0 & 0 & 0 & 0 & 0 \\ 0 & 0 & 0 & 1 & 0 & 1 & 0 & 0 & 0 & 0 & 0 & 0 & 0 \\ 0 & 0 & 0 & 1 & 0 & 0 & 1 & 0 & 0 & 0 & 0 & 0 & 0 \\ 0 & 0 & 0 & 0 & 1 & 0 & 1 & 0 & 0 & 0 & 0 & 0 & 0 \\ 0 & 0 & 0 & 0 & 1 & 0 & 0 & 1 & 0 & 0 & 0 & 0 & 0 \\ 0 & 0 & 0 & 0 & 0 & 1 & 0 & 0 & 1 & 0 & 0 & 0 & 0 \\ 0 & 0 & 0 & 0 & 0 & 0 & 1 & 0 & 1 & 0 & 0 & 0 & 0 \\ 0 & 0 & 0 & 0 & 0 & 0 & 1 & 0 & 0 & 1 & 0 & 0 & 0 \\ 0 & 0 & 0 & 0 & 0 & 0 & 0 & 1 & 0 & 1 & 0 & 0 & 0 \\ 0 & 0 & 0 & 0 & 0 & 0 & 0 & 1 & 0 & 1 & 0 & 0 & 0 \\ 0 & 0 & 0 & 0 & 0 & 0 & 0 & 0 & 1 & 0 & 1 & 0 & 0 \\ 0 & 0 & 0 & 0 & 0 & 0 & 0 & 0 & 1 & 0 & 0 & 1 & 0 \\ 0 & 0 & 0 & 0 & 0 & 0 & 0 & 0 & 0 & 1 & 0 & 1 & 0 \\ 0 & 0 & 0 & 0 & 0 & 0 & 0 & 0 & 0 & 1 & 0 & 0 & 1 \end{pmatrix} \cdot \begin{pmatrix} vPa \\ vPb \\ vPc \\ vPd \\ vPe \\ vPf \\ vPg \\ vPh \\ vPi \\ vPj \\ vPk \\ vPl \\ vPm \end{pmatrix} = \begin{pmatrix} vR1 \\ vR2 \\ vR3 \\ vR4 \\ vR5 \\ vR6 \\ vR7 \\ vR8 \\ vR9 \\ vR10 \\ vR11 \\ vR12 \\ vR13 \\ vR14 \\ vR15 \\ vR16 \end{pmatrix}$$

FIG. 28

$$\begin{pmatrix} 1 & 0 & 0 & 1 & 0 & 0 & 0 & 0 & 0 & 0 & 0 & 0 & 0 \\ 0 & 1 & 0 & 1 & 0 & 0 & 0 & 0 & 0 & 0 & 0 & 0 & 0 \\ 0 & 1 & 0 & 0 & 1 & 0 & 0 & 0 & 0 & 0 & 0 & 0 & 0 \\ 0 & 0 & 1 & 0 & 1 & 0 & 0 & 0 & 0 & 0 & 0 & 0 & 0 \\ 0 & 0 & 0 & 1 & 0 & 1 & 0 & 0 & 0 & 0 & 0 & 0 & 0 \\ 0 & 0 & 0 & 1 & 0 & 0 & 1 & 0 & 0 & 0 & 0 & 0 & 0 \\ 0 & 0 & 0 & 0 & 1 & 0 & 1 & 0 & 0 & 0 & 0 & 0 & 0 \\ 0 & 0 & 0 & 0 & 1 & 0 & 0 & 1 & 0 & 0 & 0 & 0 & 0 \\ 0 & 0 & 0 & 0 & 0 & 1 & 0 & 0 & 1 & 0 & 0 & 0 & 0 \\ 0 & 0 & 0 & 0 & 0 & 0 & 1 & 0 & 1 & 0 & 0 & 0 & 0 \\ 0 & 0 & 0 & 0 & 0 & 0 & 1 & 0 & 0 & 1 & 0 & 0 & 0 \\ 0 & 0 & 0 & 0 & 0 & 0 & 0 & 1 & 0 & 1 & 0 & 0 & 0 \\ 0 & 0 & 0 & 0 & 0 & 0 & 0 & 0 & 1 & 0 & 1 & 0 & 0 \\ 0 & 0 & 0 & 0 & 0 & 0 & 0 & 0 & 1 & 0 & 0 & 1 & 0 \\ 0 & 0 & 0 & 0 & 0 & 0 & 0 & 0 & 0 & 1 & 0 & 1 & 0 \\ 0 & 0 & 0 & 0 & 0 & 0 & 0 & 0 & 0 & 1 & 0 & 0 & 1 \end{pmatrix} \cdot \begin{pmatrix} vPa \\ vPb \\ vPc \\ vPd \\ vPe \\ vPf \\ vPg \\ vPh \\ vPi \\ vPj \\ vPk \\ vPl \\ vPm \end{pmatrix} = \begin{pmatrix} vI1 \\ vI2 \\ vI3 \\ vI4 \\ vI5 \\ vI6 \\ vI7 \\ vI8 \\ vI9 \\ vI10 \\ vI11 \\ vI12 \\ vI13 \\ vI14 \\ vI15 \\ vI16 \end{pmatrix}$$

| I1<br>(−0.0769) | I2<br>(−0.0385) | I3<br>(−0.0385) | I4<br>(−0.0769) |
| --- | --- | --- | --- |
| I5<br>(−0.0385) | I6<br>(0.2308) | I7<br>(0.2308) | I8<br>(−0.0385) |
| I9<br>(−0.0385) | I10<br>(0.2308) | I11<br>(0.2308) | I12<br>(−0.0385) |
| I13<br>(−0.0769) | I14<br>(−0.0385) | I15<br>(−0.0385) | I16<br>(−0.0769) |

IMAGE GENERATION APPARATUS, METHOD, AND RECORDING MEDIUM FOR PROJECTING A PLURALITY OF PHASE IMAGES OVERLAPPING EACH OTHER WITH A PREDETERMINED AMOUNT OF SHIFT

CROSS REFERENCES TO RELATED APPLICATIONS

The present invention contains subject matter related to Japanese Patent Application JP 2007-111327 filed in the Japanese Patent Office on Apr. 20, 2007, the entire contents of which are incorporated herein by reference.

BACKGROUND OF THE INVENTION

1. Field of the Invention

The present invention relates to an image generation apparatus, method, program, and recording medium. More particularly, the present invention relates to an image generation apparatus, method, program, and recording medium which generate phase images having lower resolutions than an image to be originally projected, and to be projected onto a projection plane with the same image quality as the original image by overlapping each other with a predetermined amount of shift.

2. Description of the Related Art

For a method of projecting, onto a projection plane, a projection image having the same resolution as an input image using projectors projecting projection images having lower resolutions than an image to be originally projected (in the following, called an input image), there is a method called wobulation (for example, refer to "Wobulation: Doubling the Addressed Resolution of Projection Displays", Will Allen (Digital Projection and Imaging, Hewlett-Packard, Corvallis, Oreg., USA) and Robert Ulichney (HP Labs, Cambridge, Mass., USA) in the Proceeding of SID 2005).

For example, sub-images, as shown by a second image and a third image from lower left in FIG. 1, having a resolution one half the resolution of the input image are generated from an input image as shown by a first image from lower left in FIG. 1. The sub-images are projected onto the positions overlapping each other with a shift of a half of the pixel of the sub-image at time intervals allowing obtaining time integration effect of a human visual sense.

As a result, as shown in the upper right, it is possible to show a projection image having a resolution two times the resolution of the input image.

In the wobulation method, sub-images are displayed at time intervals allowing time integration effect of a visual sense. However, a display system obtaining the same effect is also considered by simultaneously projecting sub-images using a plurality of projectors (for example, refer to Yang, Ruigang, David Gotz, Justin Hensley, Herman Towles and Mike Brown, "PixelFlex: A Reconfigurable Multi-Projector Display System" IEEE Visualization 2001, San Diego, Calif. (Oct. 21-26, 2001)).

FIG. 2 shows an example of a display by this display system.

SUMMARY OF THE INVENTION

However, for example, in the wobulation method, a pixel value of a pixel in a sub-image is uniquely determined by a pixel value of one corresponding predetermined pixel in an input image.

For example, the pixel value of a pixel of the first sub-image in the second row and the second column is determined to be the pixel value of a pixel of the input image in the third row and the third column, and the pixel value of a pixel of the second sub-image in the first row and the first column is determined to be the pixel value of a pixel of the input image in the second row and the second column.

Accordingly, for example, a luminance value of an area of a projection image formed by pixels of sub-images overlapping does not necessarily match the luminance value of the pixel of a corresponding input image of the area. Thus, although a projection image projected by the wobulation method has the same resolution as that of the input image, the projection image becomes just like a blurred image, and does not have the same image quality as that of the input image.

The present invention has been made in view of such circumstances. It is desirable to make it possible to generate phase images producing a projection image having the same image quality as that of an input image by the phase images having lower resolutions than the input image and being projected on a projection plane so as to overlap each other with a predetermined amount of shift.

According to an embodiment of the present invention, there is provided an image generation apparatus for generating, from an input image, a plurality of phase images having lower resolutions than the input image and overlapping each other with a predetermined amount of shift when being projected onto a projection plane, the apparatus including when the plurality of phase images are projected onto the projection plane, means for relating an area formed by a predetermined pixel of the plurality of phase images overlapping individually to a predetermined pixel of the input image, and calculating a pixel value of a pixel of the phase images having a smallest difference between a pixel value of the corresponding area and a pixel value of a pixel of the input image.

The image generation apparatus according to an embodiment of the present invention may further include projection means for projecting the plurality of phase images onto the projection plane.

According to another embodiment of the present invention, there is provided a program for causing a computer to perform image generation processing generating, from an input image, a plurality of phase images having lower resolutions than the input image and overlapping each other with a predetermined amount of shift when being projected onto a projection plane, the processing including the steps of, when the plurality of phase images are projected onto the projection plane, relating an area formed by overlapping a predetermined pixel of the plurality of phase images individually to a predetermined pixel of the input image, and calculating a pixel value of a pixel of the phase images having a smallest difference between a pixel value of the corresponding area and a pixel value of a pixel of the input image.

According to another embodiment of the present invention, there is provided a method including the steps of when a plurality of phase images are projected onto the projection plane, relating an area formed by a predetermined pixel of the plurality of phase images overlapping individually to a predetermined pixel of the input image, and calculating a pixel value of a pixel of the phase images having a smallest difference between a pixel value of the corresponding area and a pixel value of a pixel of the input image.

By an embodiment of the present invention, it is possible to generate phase images producing a projection image having the same image quality as that of an input image by the phase images having a lower resolution than an input image and being projected onto a projection plane so as to overlap each other with a predetermined amount of shift.

BRIEF DESCRIPTION OF THE DRAWINGS

FIG. 4 is a diagram schematically illustrating four phase images;

FIG. 5 is a diagram illustrating an example of a configuration of an image processing unit 11;

FIG. 6 is a flowchart illustrating image projection processing by an image projection system 1;

FIG. 7 is a diagram illustrating a principle of phase-image generation processing;

FIG. 8 is a diagram illustrating a relational expression including a vector of luminance values vR of an area R, a vector of luminance values vP of pixels P of a projected image Q', and a matrix M;

FIG. 9 is a diagram illustrating a relational expression when luminance values vR of areas R1 to R16 are set to luminance values vI of pixels I of the corresponding image W';

FIG. 27 is a diagram illustrating a relational expression including a vector of luminance values vR of an area R, a vector of luminance values vP of a projected image Q', and a matrix M;

FIG. 28 is a diagram illustrating a relational expression of FIG. 8 when luminance values vR of areas R1 to R16 are set to luminance values vI of pixels I of the corresponding image W';

DESCRIPTION OF THE PREFERRED EMBODIMENTS

In the following, a description will be given of an embodiment of the present invention. The relationship between the constituent features of the present invention and the embodiment described in this specification or the drawings is exemplified as follows. This description is for confirming that an embodiment supporting the present invention is included in the specification or the drawings. Accordingly, if there is an embodiment included in the specification or the drawings, but not included here as an embodiment corresponding to the constituent features of the present invention, the fact does not mean that the embodiment does not correspond to the constituent features of the invention. On the contrary, if an embodiment is included here as constituent features corresponding to the present invention, the fact does not mean the embodiment does not correspond to the constituent features other than that constituent feature.

According to an embodiment of the present invention, there is provided an image generation apparatus (for example, an image processing unit 11 in FIG. 3) for generating, from an input image, a plurality of phase images having lower resolutions than the input image and overlapping each other with a predetermined amount of shift when being projected onto a projection plane, the apparatus including when the plurality of phase images are projected onto the projection plane, means for relating an area formed by a predetermined pixel of the plurality of phase images overlapping individually to a predetermined pixel of the input image, and calculating a pixel value of a pixel of the phase images having a smallest difference between a pixel value of the corresponding area and a pixel value of a pixel of the input image.

The image generation apparatus according to an embodiment of the present invention may further include projection means (for example, projectors 12A to 12D in FIG. 3) for projecting the plurality of phase images onto the projection plane.

According to another embodiment of the present invention, there is provided a program for causing a computer to perform image generation processing generating, from an input image, a plurality of phase images having lower resolutions than the input image and overlapping each other with a predetermined amount of shift when being projected onto a projection plane, the processing including the steps of, when the plurality of phase images are projected onto the projection plane, relating an area formed by a predetermined pixel of the plurality of phase images overlapping individually to a predetermined pixel of the input image, and calculating a pixel value of a pixel of the phase images having a smallest difference between a pixel value of the corresponding area and a pixel value of a pixel of the input image (for example, step S2 in FIG. 6).

In the following, a description will be given of an embodiment to which the present invention is applied with reference to the drawings.

Figure 1:
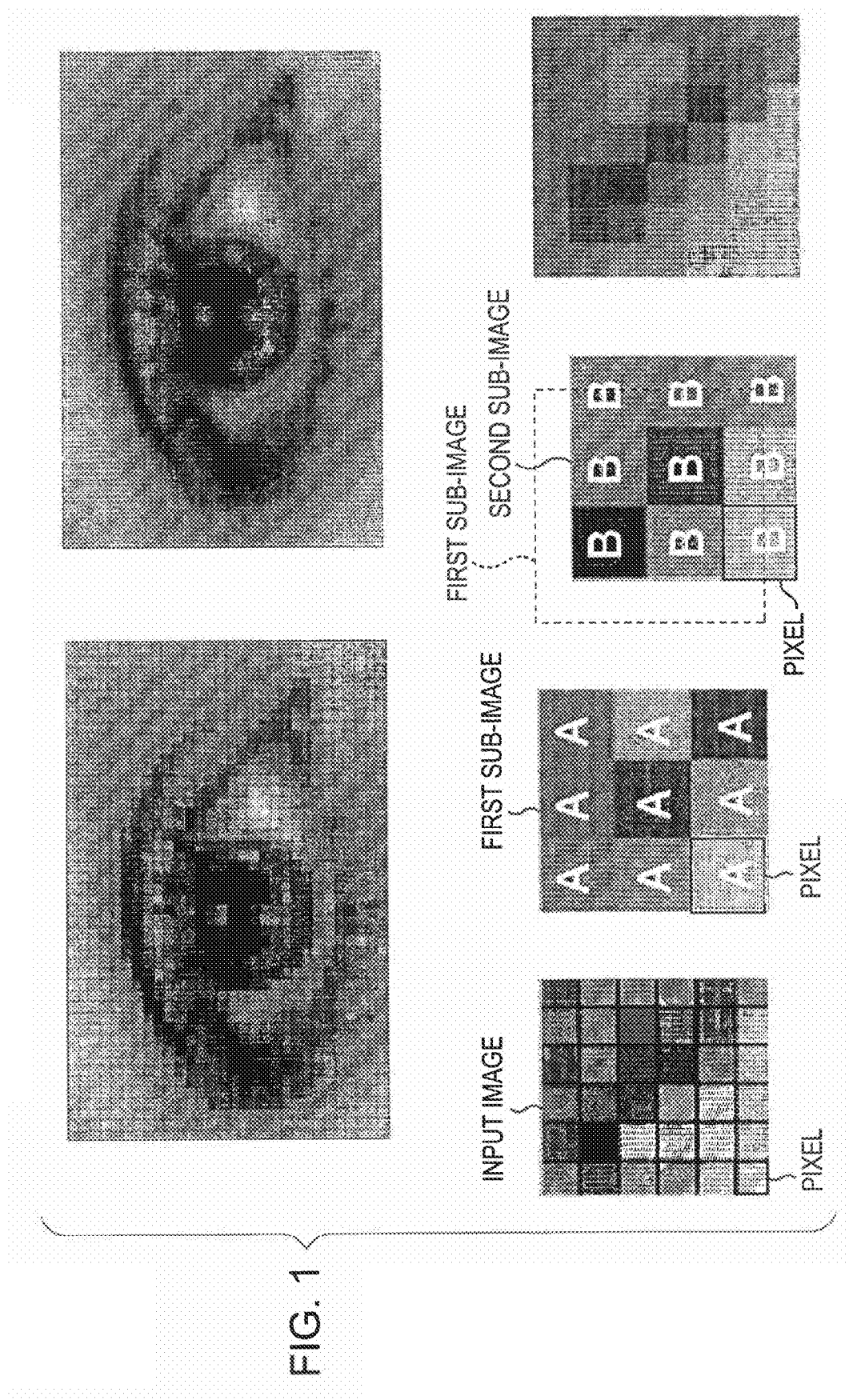
FIG. 1 is a diagram illustrating wobulation.
Figure 2:
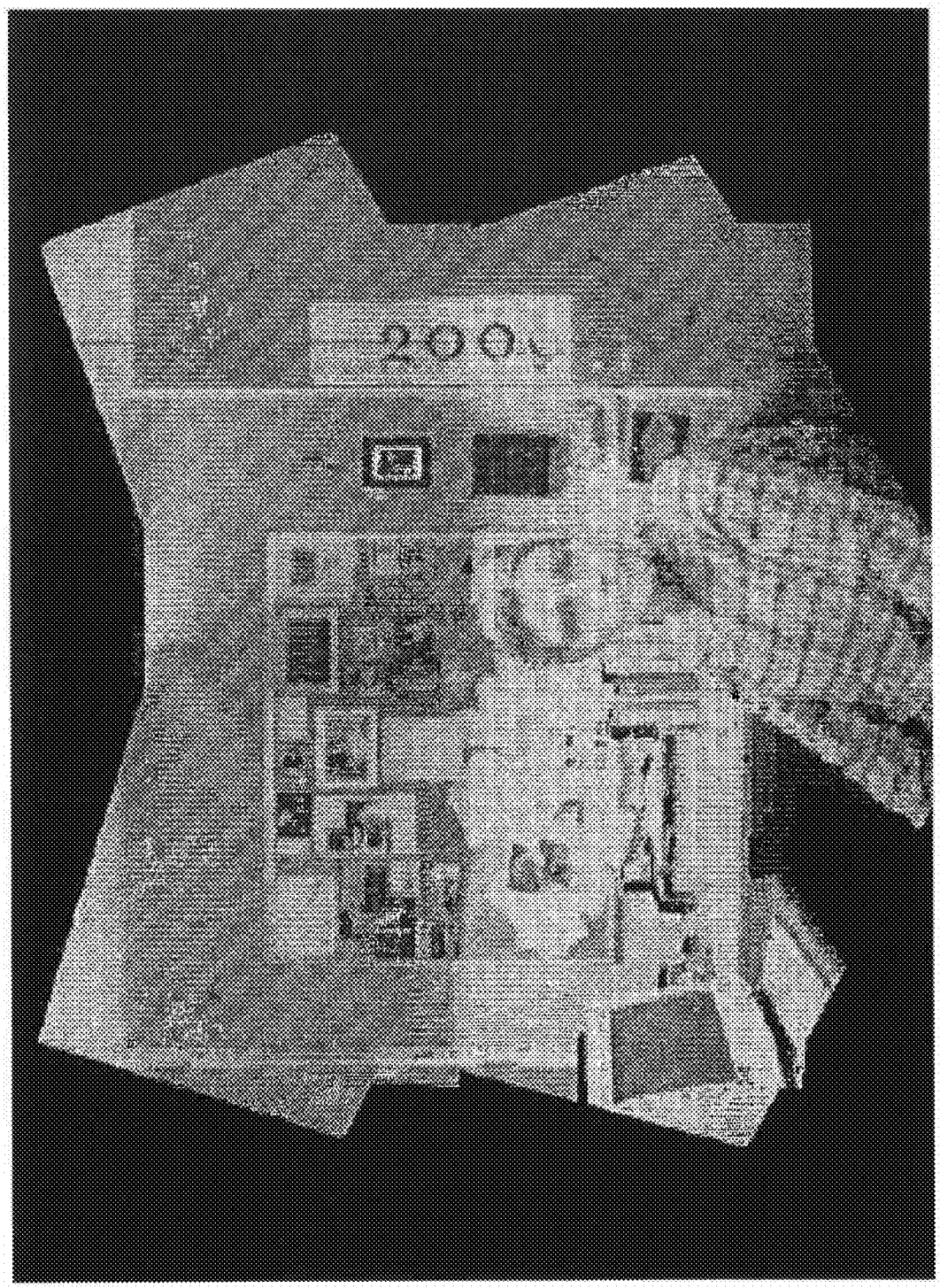
FIG. 2 is a view illustrating an example of a display by a display system.
Figure 3:
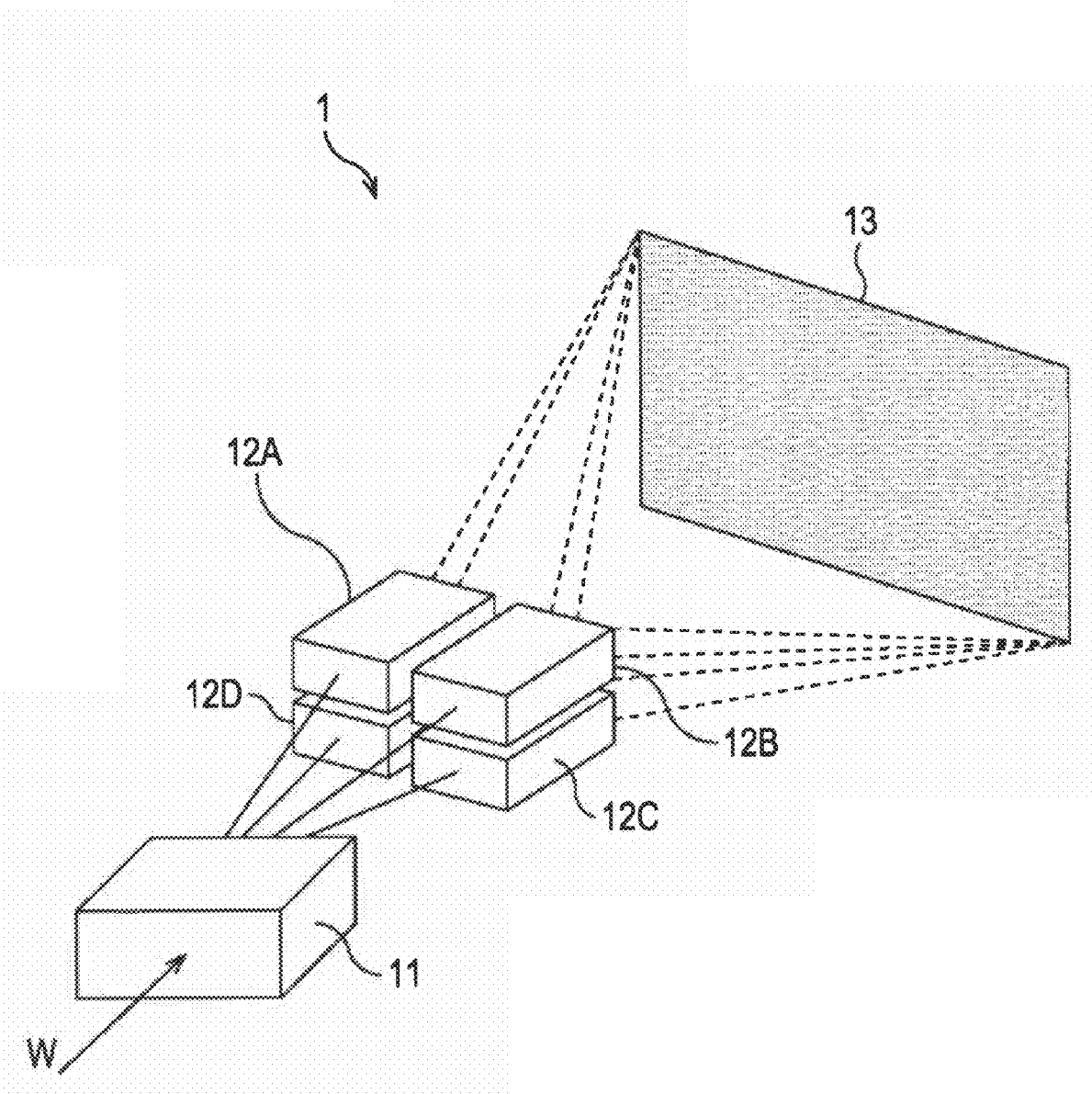
FIG. 3 is a diagram illustrating an example of a configuration of an image projection system.

FIG. 3 illustrates an example of a configuration of an image projection system 1 capable of projecting a projection image having the same resolution as that of the input image and the same image quality as that of the input image using a plurality of projectors projecting projection images having lower resolutions than an input image.

The image projection system 1 includes an image processing unit 11, four projectors 12A, 12B, 12C, and 12D, and a projection plane 13.

An input image W having a resolution two times the resolution of the projection image projected by each of the projectors 12A, 12B, 12C, and 12D (in the following, simply called a projector 12 when it is not necessary to distinguish them individually) is input into the image processing unit 11.

As described later, the image processing unit 11 generates four projection images (in the following, called phase images) having resolutions one half the resolution of the input image W, and supplies the images to the corresponding projector 12.

Here, the resolution indicates the fineness of a grid expressing an image. Thus, when the resolution becomes one half, the pitch of a pixel becomes two times and the size of the pixel becomes four times.

Each projector 12 includes is a transmissive liquid crystal projector, a reflective liquid crystal projector, a DLP (Digital Light Processing) projector, or the like. Each projector 12 projects the phase images supplied from the image processing unit 11 onto the projection plane 13 such that the four phase images overlap each other with a shift of a half of the pixel of the phase image individually in the vertical direction and the horizontal directions (that is to say, with the amount of shift d/2 of one-half the vertical and the horizontal size of a pixel assuming that the pixel pitch is d).

As shown in FIG. 4, which schematically illustrates four phase images, the projector 12A projects a phase image Q1 onto a predetermined position, the projector 12B projects a phase image Q2 onto a position having the amount of shift d/2 from the phase image Q1 rightward, the projector 12C projects a phase image Q3 onto a position having the amount of shift d/2 from the phase image Q2 downward, and the projector 12D projects a phase image Q4 onto a position having the amount of shift d/2 from the phase image Q3 leftward.

FIG. 5 illustrates an example of a configuration of the image processing unit 11.

An input section 21 supplies the input image W supplied to the image processing unit 11 to an image processing section 22.

The image processing section 22 generates four phase images Q1 to Q4 to be projected by each projector 12 with being overlapped each other with a shift of a half of a pixel of the phase image Q individually in the vertical direction and the horizontal directions to produce a projection image having the same resolution as that of the input image W and having the same image quality as the input image W (the details thereof will be described later), and supplies them to a distribution section 23.

The distribution section 23 distributes the four phase images Q1 to Q4 supplied from the image processing section 22 to each projector 12. That is to say, the distribution section 23 supplies the phase image Q1 to the projector 12A, supplies the phase image Q2 to the projector 12B, supplies the phase image Q3 to the projector 12C, and supplies the phase image Q4 to the projector 12D.

Next, a description will be given of the image projection processing by the image projection system 1 of FIG. 5 with reference to the flowchart of FIG. 6.

In step S1, when the input image W is supplied to the image processing unit 11, an input section 21 of the image processing unit 11 receives the input image W supplied to the image processing unit 11, and supplies the input image W to the image processing section 22.

In step S2, the image processing section 22 generates four phase images Q from the input image W by performing phase-image generation section described later, and supplies the images to the distribution section 23.

In step S3, the distribution section 23 distributes the phase images Q supplied from the image processing section 22 to each corresponding projector 12.

In step S4, each projector 12 projects the phase images Q supplied from the image processing unit 11 (the distribution section 23 thereof) onto the projection plane 13 such that four phase images Q are overlapped each other with a shift of a half of a pixel of the phase image Q individually in the vertical and the horizontal directions.

Next, a description will be given of phase-image generation processing of the image processing section 22 in step S2. First, the principle thereof will be described with reference to FIG. 7.

If four projection images Q'1 to Q'4 (in the following, called projection images Q' when it is not necessary to distinguish them individually) having resolutions one half the resolution of a predetermined image W' are projected such that the projection images overlap each other with a shift of a half of a pixel of the phase image individually in the vertical and the horizontal directions, that is to say, the projection images are projected such that the reference lines drawn in accordance with the projection images Q' match, areas R1 to R16 (in the figure, shaded areas in the projection image Z) formed by individually predetermined pixels P of the four projection images Q' overlapping are formed on the projection image Z obtained as a result.

The luminance values vR1 to vR16 of the areas R1 to R16 of the projection image Z are determined by the luminance values vP of the pixels P of the four projection images Q' overlapping each other.

For example, the area R1 is formed by a pixel Pa of the projection image Q'1, a pixel Pb of the projection image Q'2, a pixel Pg of the projection image Q'3, and a pixel Pf of the projection image Q'4 overlapping one another, and thus the luminance value vR1 of the area R1 becomes the sum of a luminance value vPa of the pixel Pa, a luminance value vPb of the pixel Pb, a luminance value vPg of the pixel Pg, and a luminance value vPf of the pixel Pf.

The area R6 is formed by a pixel Pm of the projection image Q'1, a pixel P1 of the projection image Q'2, a pixel Pg of the projection image Q'3, and a pixel Ph of the projection image Q'4 overlapping one another, and thus the luminance value vR6 of the area R6 becomes the sum of a luminance value vPm of the pixel Pm, a luminance value vP1 of the pixel P1, a luminance value vPg of the pixel Pg, and a luminance value vPh of the pixel Ph.

Also, the projection images Q1 are projected such that individual images overlap each other with a shift of one-half the size of the pixel in the vertical and the horizontal directions, and thus the size of the area R becomes one fourth the size of the pixel P. That is to say, the size of the area R becomes the size of the pixels I of the image W' having a resolution two time the resolution of the projection images Q'.

Accordingly, from the above, if the luminance value vP of the pixel P of each projection image Q' is determined such that the luminance values vR1 to vR16 of the areas R1 to R16 individually become the luminance values vI1 to vI16 of the pixels I1 to I16 of the image W', it is possible to project a projection image Z having the same resolution as that of the image W' and having the same image quality as that of the image W' by projecting four projection images Q' overlapping each other with a shift of a half of a pixel of the projection image Q' individually in the vertical and the horizontal directions.

The present invention uses this principle, and the image processing section 22 determines the luminance values of the pixels of the images Q such that the overlapped area (in the example in FIG. 7, the areas R1 to R16) formed by overlapping the pixels of the four phase images Q become the same luminance values as the luminance values of the pixels of the corresponding input image W to generate each phase image.

A more specific description will be given of the generation processing of the phase images Q.

In the example of FIG. 7, a relationship between the luminance values vR of the area R and the luminance values vP of the pixels P of the projection image Q', in which the luminance values vR of the area R is the sum of individually predetermined luminance values vP of pixels P of the projection image Q'1, luminance values vP of pixels P of the projection image Q'2, luminance values vP of pixels P of the projection image Q'3, and luminance values vP of pixels P of the projection image Q'4, can be expressed by a relational expression, as shown in FIG. 8, including a vector of the luminance values vR of the area R, a vector of the luminance values vP of pixels P of the projection image Q', and a predetermined 16×25 matrix M.

For example, if attention is given to a first row of the matrix M, the luminance values of the area R1 becomes vR1=vPa+vPb+vPg+vPf, which matches the above-described relationship.

Thus, the individual areas R1 to R16 are related to predetermined pixels I of the image W', and the luminance values vR of the areas R1 to R16 in this relational expression are determined to be the luminance values vI of the corresponding pixels I of the image W' as shown in FIG. 9. If the luminance values vP of the pixels P of the projection images Q'1 to Q'4 are solved, the luminance values vP of the pixels P of the projection image Q' such that the individual luminance values vR of the area R become the luminance values I of the corresponding pixels I of the image W' can be obtained.

In order to solve the luminance values vP of the pixels P of the projection image Q' from this relational expression, a relational expression expressing the vector of the luminance values vP of the pixels P of the projection image Q' by the vector of the luminance values vI of the image W' becomes necessary. The inverse matrix of the matrix M, which becomes necessary for the relational expression, can be obtained as follows. For example, as shown by Expression (1), the matrix M is decomposed into matrices U and V having an orthogonal vector as a column vector, and a diagonal matrix D having positive diagonal elements by a method called singular value decomposition. Thus, as shown by Expression (2), the inverse matrix can be obtained using the matrices U and V, and a diagonal matrix D'.

$$M = U^T D V \tag{1}$$

$$M^{-1} = V^T D' U \tag{2}$$

In Expression (2), the diagonal matrix D' is a matrix having the reciprocals of the individual diagonal elements of the diagonal matrix D as its diagonal elements. In this regard, if a diagonal element of the diagonal matrix D is 0, the diagonal element of the diagonal matrix D' corresponding to that diagonal element is also assumed to be 0.

Figure 10:
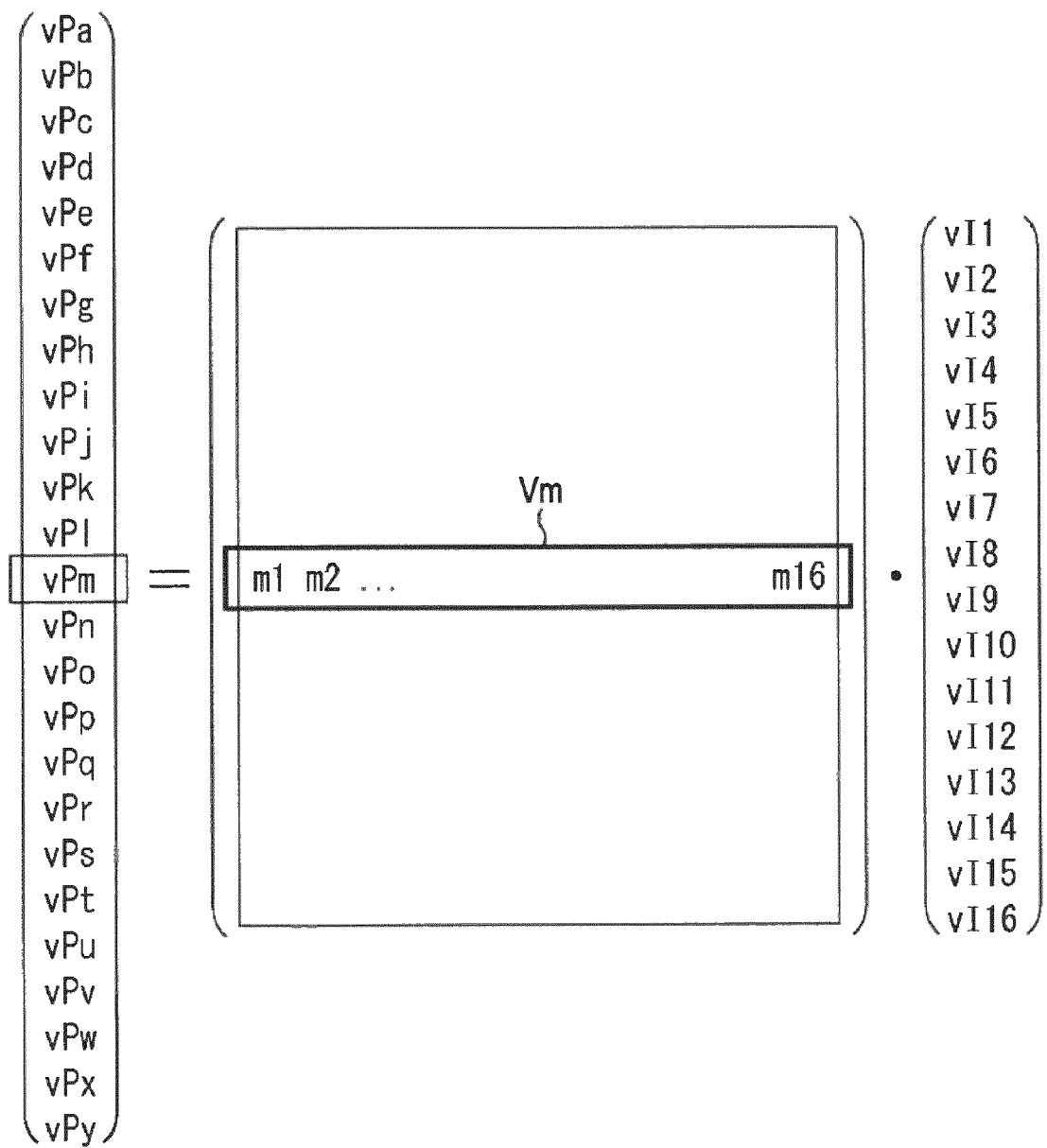
FIG. 10 is a diagram illustrating a relational expression expressing a vector of luminance values vP of the projected image Q' by a vector of the luminance values vI of the image W'.

By multiplying such a generalized inverse matrix $M^{-1}$ on both sides of the relational expression of FIG. 9 from left, as shown in FIG. 10, a relational expression expressing the vector of the luminance values vP of the projection image Q' can be obtained by the vector of the luminance values vI of the pixels I of the image W'.

By this relational expression, for example, in the example in FIG. 7, luminance values vPm of a pixel Pm of the projection image Q'1 related to the formation of the areas R6, R7, R10, and R11, which corresponds to the four central pixels I6, I7, I10, and I11 of the 16 pixels I1 to I16 of the image W', is the inner product of the vector of the luminance values vI of the pixels I of the image W' and the row vector of Vm (the elements thereof are m1, m2, ..., m16) of the thirteenth row of the generalized inverse matrix $M^{-1}$, and thus can be obtained by Expression (3).

$$vPm = m1 \cdot vI1 + m2 \cdot vI2 + \ldots + m16 \cdot vI16 \tag{3}$$

Figure 11:
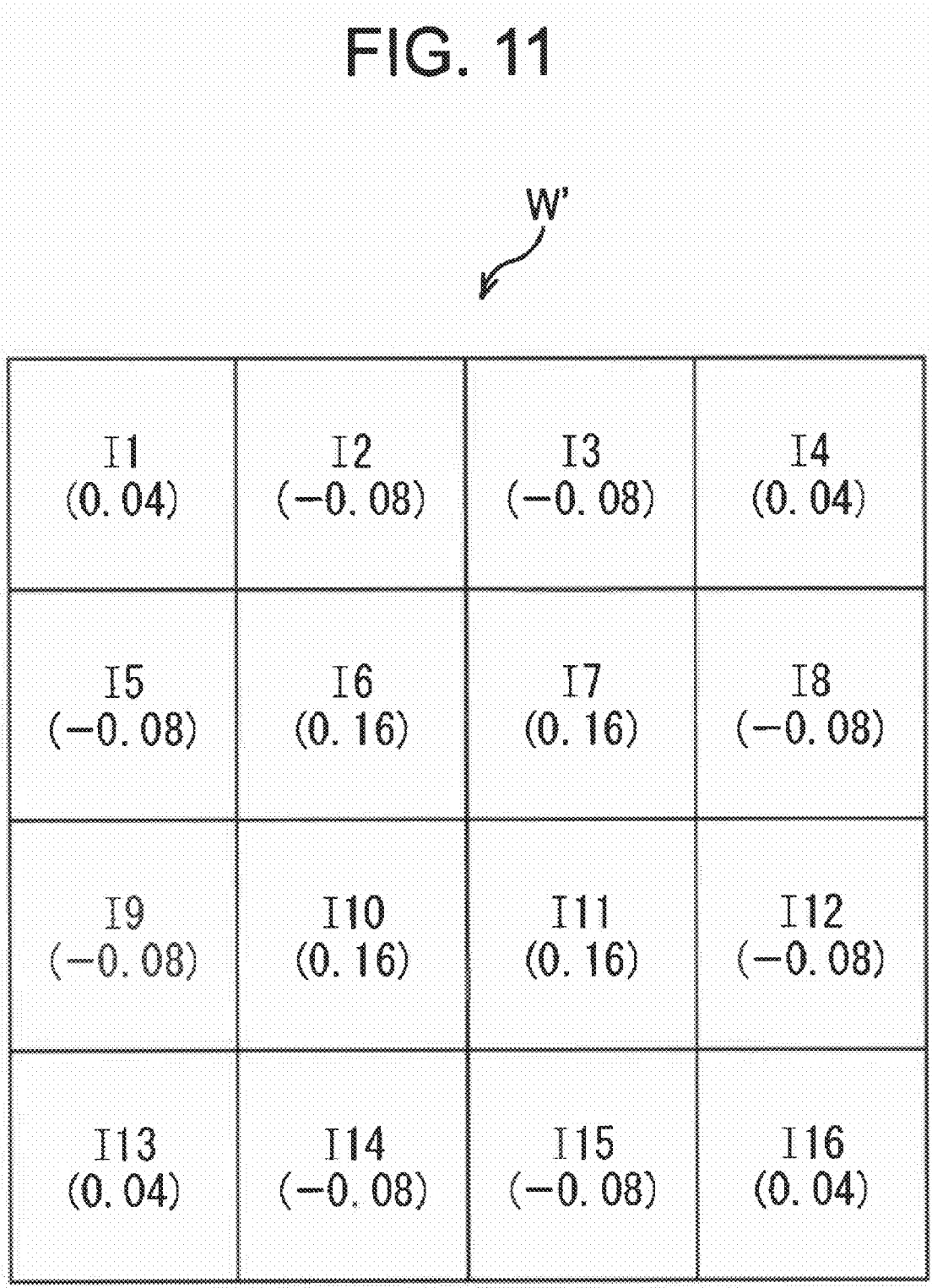
FIG. 11 is a diagram illustrating a row vector Vm of a thirteenth row of a generalized inverse matrix $M^{-1}$.

In this regard, the elements of the row vector Vm of the thirteenth row of the generalized inverse matrix $M^{-1}$ becomes 0.04, −0.08, −0.08, 0.04, −0.08, 0.16, 0.16, −0.08. −0.08, 0.16, 0.16, −0.08, 0.04, −0.08, −0.08, and 0.04. These elements are shown in the figure by corresponding them to individual pixels I of the image W' as shown in FIG. 11.

That is to say, in the present invention, the inner product of the luminance values of the 16 predetermined pixels read from the input image W and the row vector Vm of the thirteenth row of the generalized inverse matrix $M^{-1}$ is obtained using this method. Thus, the luminance value of the pixel (in the following, appropriately called a corresponding pixel) (the pixel Pm) of the phase images Q related to the formation of the four areas (the areas R6, R7, R10, and R11) corresponding to the four central pixels (pixels I6, I7, I10, and I11) of the 16 read-out pixels (the pixels 11 to 16 in the example of FIG. 7) is obtained.

By the relational expression shown in FIG. 10, for the luminance value vP of the pixel P of the projection image Q' other than the pixel Pm of the projection image Q', it is possible to obtain the luminance value by calculating the inner product of the row vector of a predetermined row of the generalized inverse matrix $M^{-1}$ and the vector of the luminance values vI of the pixel I of the image W'. However, in the present invention, in order to simplify the calculation, the luminance value of the corresponding pixel is obtained using only the row vector Vm of the thirteenth row of the generalized inverse matrix $M^{-1}$.

Specifically, 16 pixels are read from the input image W by shifting for each pixel in vertical and horizontal directions. The luminance values of the pixel (that is to say, the corresponding pixels) of the phase images related to the formation of the four areas corresponding to the four central pixels of the 16 pixels are obtained by the inner product of the luminance value vector and the row vector Vm of the thirteenth row of the generalized inverse matrix $M^{-1}$.

As shown in the following, in which phase images Q the corresponding pixel is included, or its position on the phase image Q is determined such that an overlapping area is formed appropriately.

For example, attention is given to one pixel of the input image W, and that pixel and pixels having a predetermined relationship with that pixel, 16 pixels in total are selected. In an example in FIG. 12, assuming that attention is given to a shaded pixel in the figure, 16 pixels in which that pixel is located in the second row and the second column (16 pixels surrounded by a frame in the figure) are selected as the inversely corresponding pixel described later.

Figure 13:
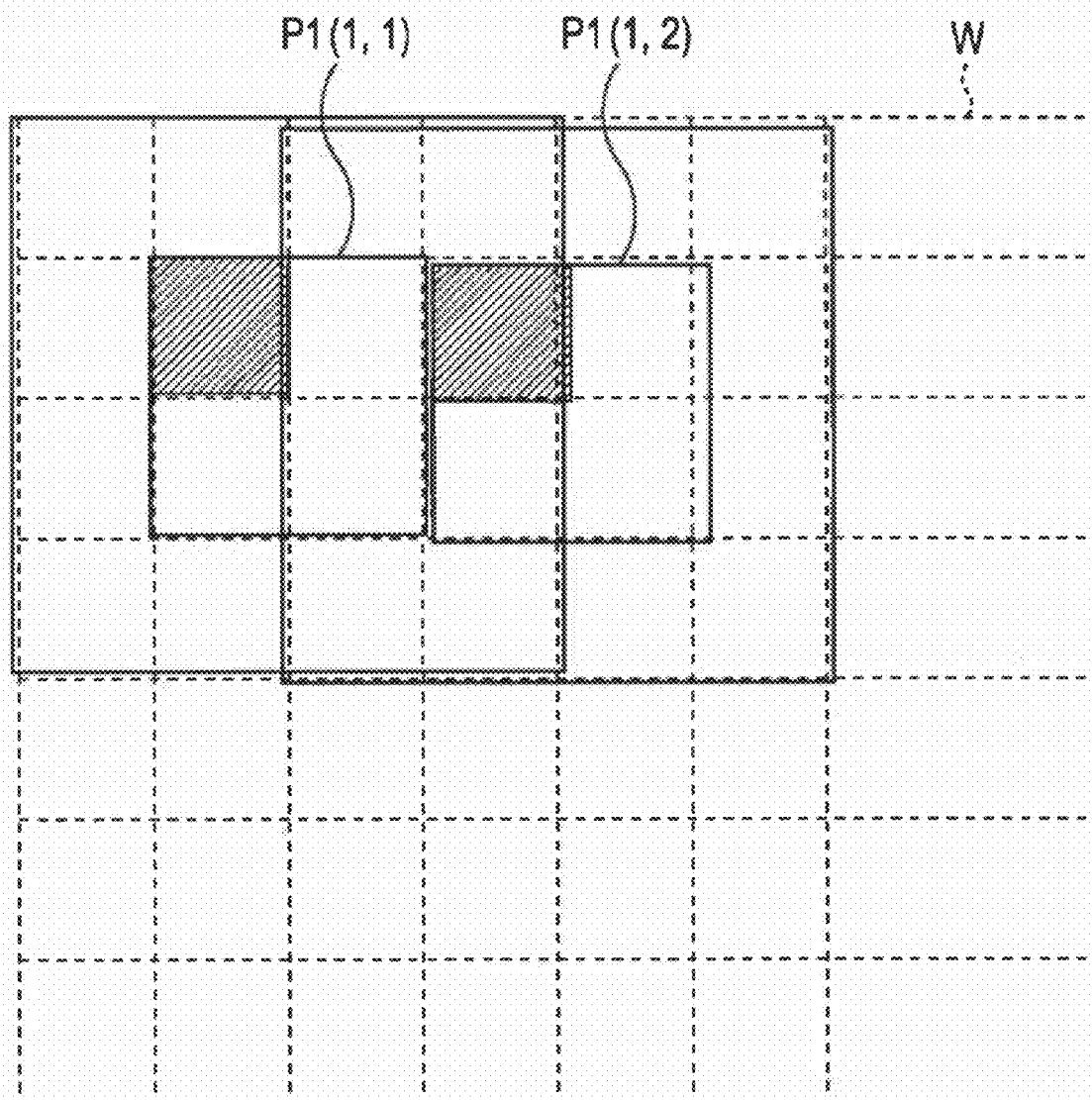
FIG. 13 is a diagram illustrating a state of determining phase images constituted by corresponding pixels.

As shown in FIG. 13, the corresponding pixel whose luminance value is calculated from the 16 inversely corresponding pixels selected when attention is given to pixels whose column number iwid and row number ihei are both even, such as the pixel in the second row and the second column, the pixel in the second row and the fourth column, etc., of the input image W is determined to be a pixel of the phase image Q1, and is determined its column number x and row number y on the phase image Q by Expression (4). Here, a function floor(a) gives a maximum integer not exceeding a real number a.

$$x = \text{floor}(iwid/2)$$

$$y = \text{floor}(ihei/2) \qquad (4)$$

For example, the column number x and the row number y of the corresponding pixel on the phase image Q1 whose luminance value is calculated from the 16 inversely corresponding pixels selected when attention is given to the pixel (the column number iwid=2 and the row number ihei=2) of the input image W become 1 (=floor (2/2)) and 1 (=floor (2/2)). Assuming that a pixel of the phase image Q1 is expressed as P1 (x, y) using the column number x and the row number y, this corresponding pixel becomes P1 (1, 1).

Figure 14:
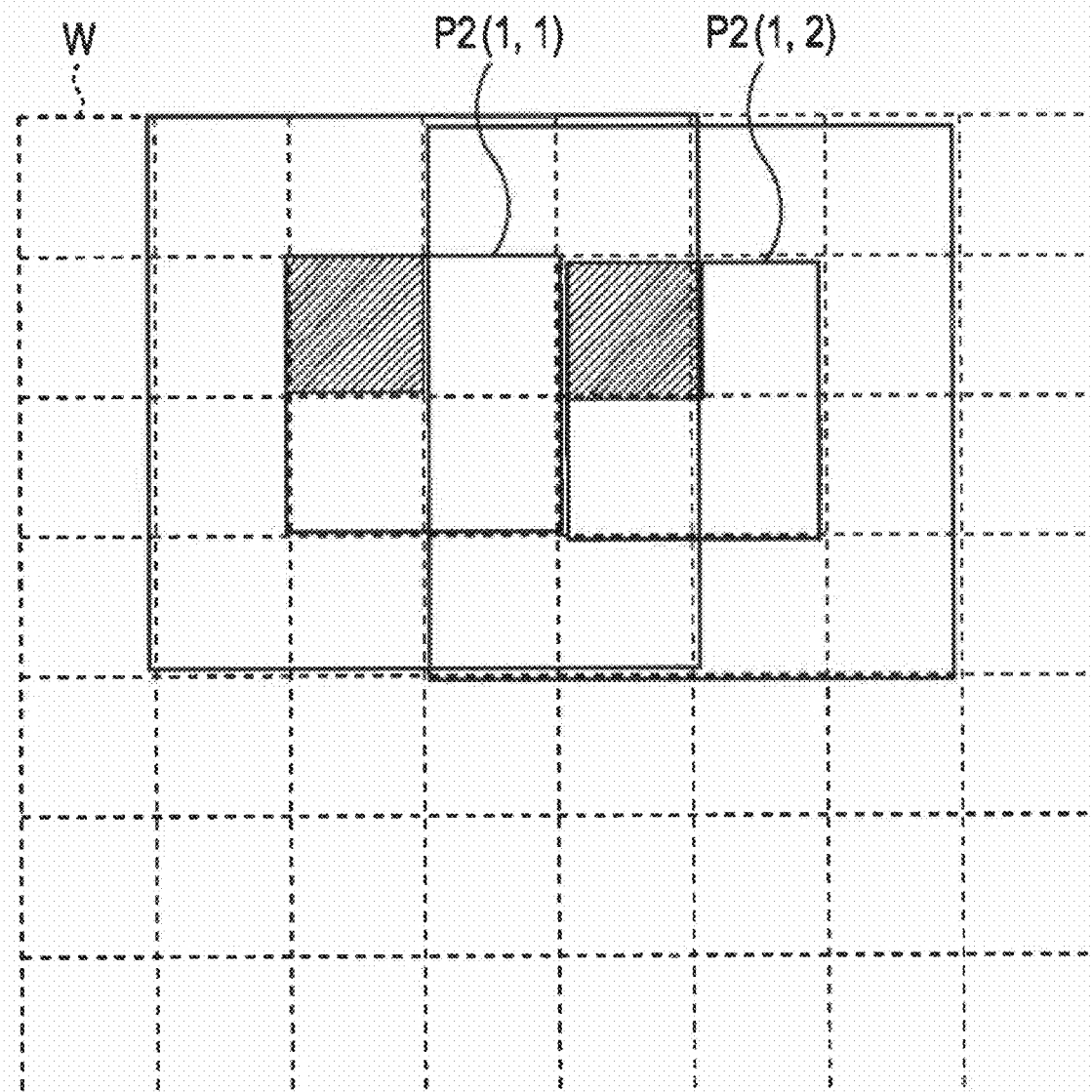
FIG. 14 is a diagram illustrating a state of determining phase images constituted by corresponding pixels.

Also, as shown in FIG. 14, the corresponding pixel whose luminance value is calculated from the 16 inversely corresponding to pixels selected when attention is given to pixels whose column number iwid is odd and row number ihei is even, such as the pixel in the second row and the third column, the pixel in the second row and the fifth column, etc., of the input image W becomes a pixel of the phase image Q2.

For example, the column number x and the row number y of the corresponding pixel on the phase image Q2 whose luminance value is calculated from the 16 inversely corresponding pixels selected when attention is given to the pixel (the column number iwid=3 and the row number ihei=2) of the input image W become 1 (=floor (3/2)) and 1 (=floor (2/2)). Assuming that a pixel of the phase image Q2 is expressed as P2 (x, y) using the column number x and the row number y, this corresponding pixel becomes P2 (1, 1).

Figure 15:
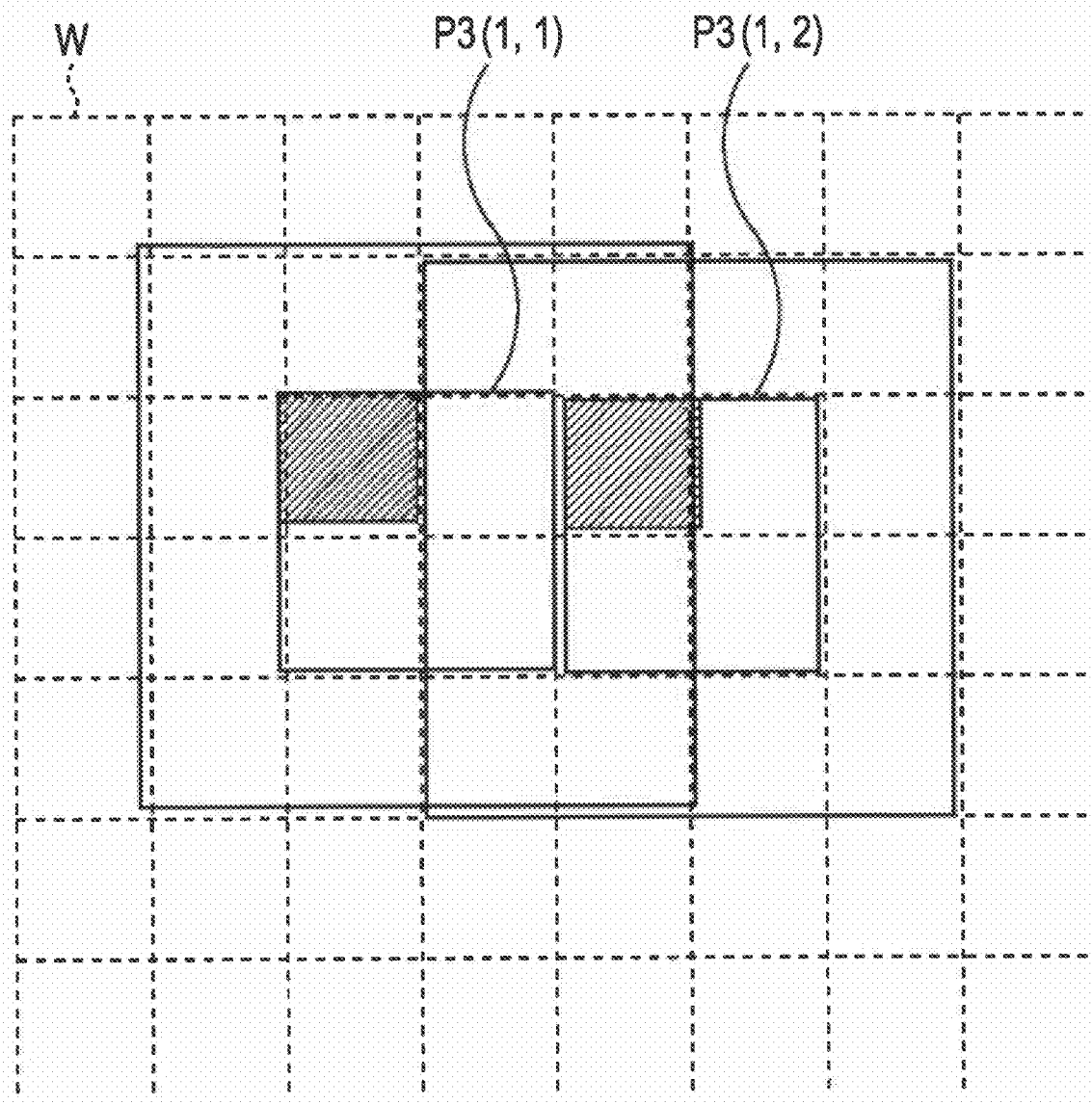
FIG. 15 is a diagram illustrating a state of determining phase images constituted by corresponding pixels.

Also, as shown in FIG. 15, the corresponding pixel whose luminance value is calculated from the 16 inversely corresponding pixels selected when attention is given to pixels whose column number iwid and row number ihei are both odd, such as the pixel in the third row and the third column, the pixel in the third row and the fifth column, etc., of the input image W becomes a pixel of the phase image Q3.

For example, the column number x and the row number y of the corresponding pixel on the phase image Q3 whose luminance value is calculated from the 16 inversely corresponding pixels selected when attention is given to the pixel (the column number iwid=3 and the row number ihei=3) of the input image W become 1 (=floor (3/2)) and 1 (=floor (3/2)). Assuming that a pixel of the phase image Q3 is expressed as P3 (x, y) using the column number x and the row number y, this corresponding pixel becomes P3 (1, 1).

Figure 16:
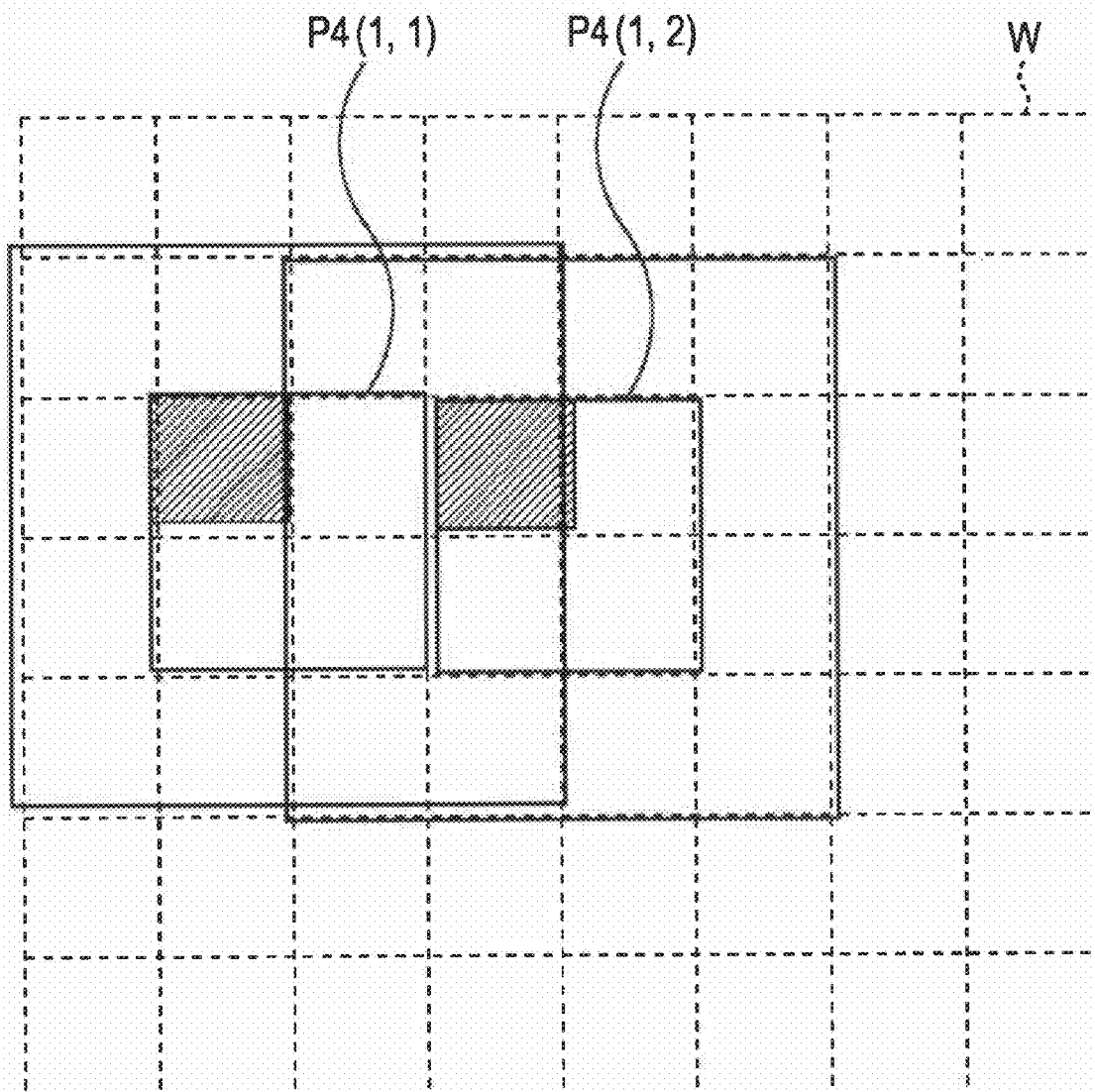
FIG. 16 is a diagram illustrating a state of determining phase images constituted by corresponding pixels.

Also, as shown in FIG. 16, the corresponding pixel whose luminance value is calculated from the 16 inversely corresponding to pixels selected when attention is given to pixels whose column number iwid is even and row number ihei is odd, such as the pixel in the third row and the second column, the pixel in the third row and the fourth column, etc., of the input image W becomes a pixel of the phase image Q4.

For example, the column number x and the row number y of the corresponding pixel on the phase image Q3 whose luminance value is calculated from the 16 inversely corresponding pixels selected when attention is given to the pixel (the column number iwid=2 and the row number ihei=3) of the input image W become 1 (=floor (2/2)) and 1 (=floor (3/2)). Assuming that a pixel of the phase image Q4 is expressed as P4 (x, y) using the column number x and the row number y, this corresponding pixel becomes P4 (1, 1).

In this manner, the image processing section 22 generates phase images Q to be projected by each projector 12 such that the phase image overlap each other with a shift of a half of a pixel of the phase image individually in the vertical and the horizontal directions to produce a projection image having the same resolution as that of the input image W and having the same image quality as the input image W.

That is to say, as shown in FIG. 5, the image processing section 22 includes a selection section 22A, a coefficient storage section 22B, and a calculation section 22C. The selection section 22A selects 16 pixels from the input image W supplied from the input section 21, and supplies the pixels to the calculation section 22C.

The calculation section 22C calculates the inner product of the luminance values of the 16 inversely corresponding pixels supplied from the selection section 22A and the value (in the following, appropriately called an inversely corresponding coefficient) of the element of the row vector Vm of the thirteen row of the generalized inverse matrix $M^{-1}$ stored in the coefficient storage section 22B. Thereby, the calculation section 22C obtains the luminance values of the corresponding pixel of the phase image Q, and disposes the values at a predetermined position of a predetermined phase image Q to generate the four phase images Q. The calculation section 22C supplies the four generated phase images Q to the distribution section 23.

Figure 17:
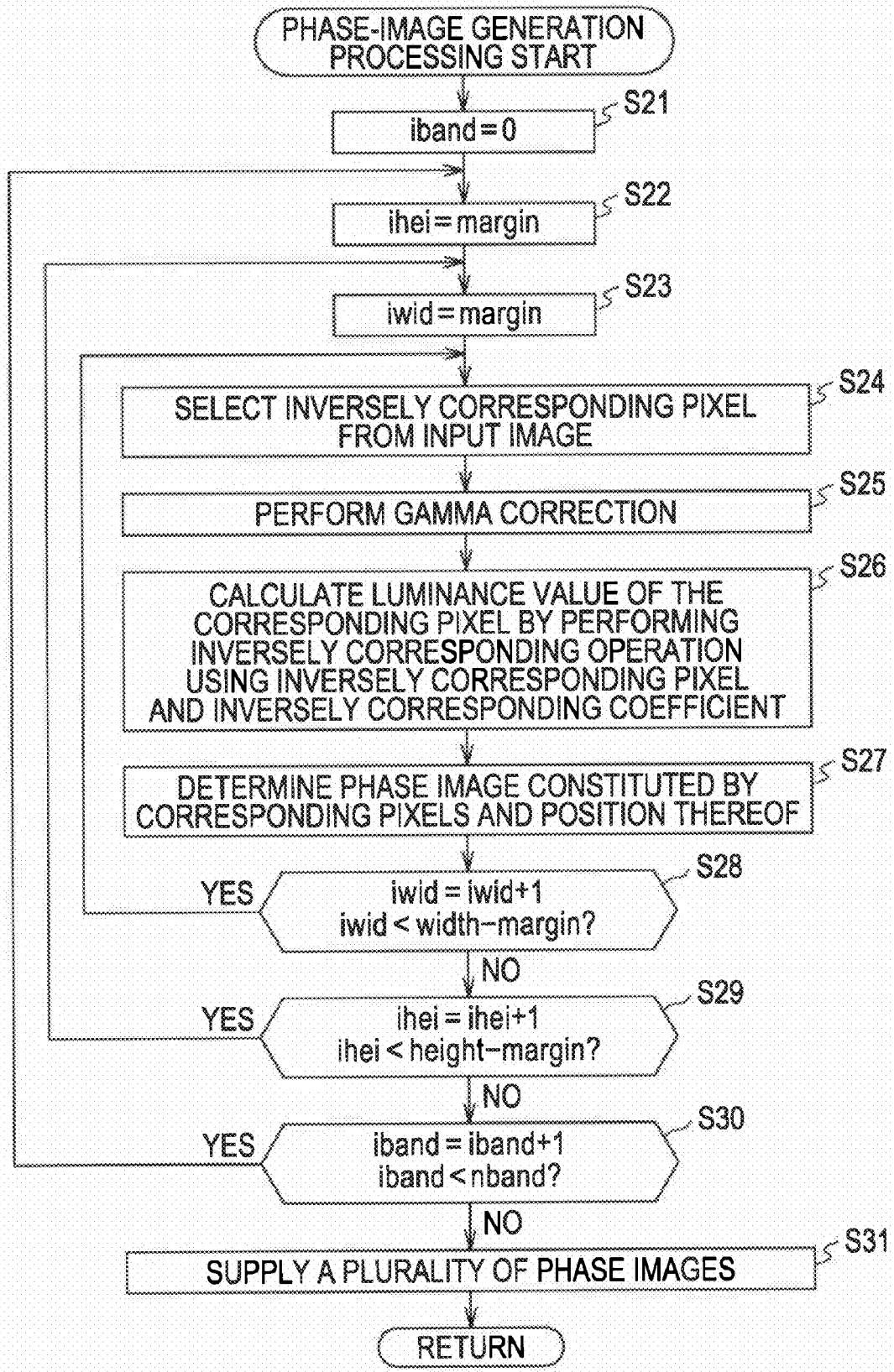
FIG. 17 is a flowchart illustrating operations of an image processing section 22.

Next, a description will be given of the operation of the image processing section 22 with reference to the flowchart of FIG. 17.

When the input section 21 receives the input image W and supplies it to the image processing section 22, in step 21, the selection section 22A of the image processing section 22 initializes a variable iband, which counts the color types of the input image W, such as RGB, etc., for example, to 0. In this regard, it is assumed that the input image W is an image for each color of the color types, such as RGB (Red, Green, and Blue) for example, and constitutes a color image.

Next, in step S22, the selection section 22A initializes a variable ihei, which counts a row number ihei of a pixel of the input image W of the color corresponding to the variable iband, to a constant margin.

Figure 12:
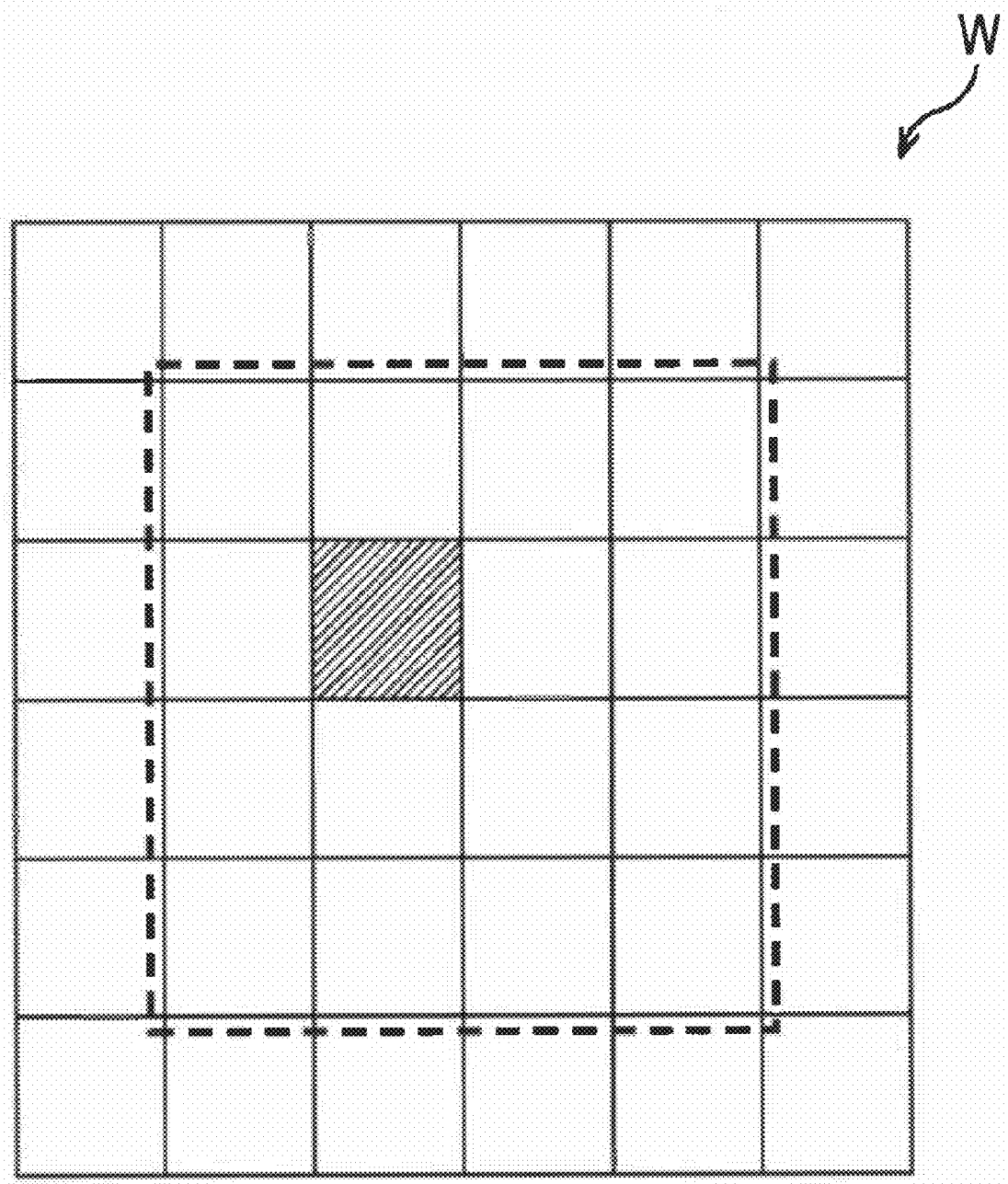
FIG. 12 is a diagram illustrating an inversely corresponding pixel.

When 16 pixels having a positional relationship as shown in FIG. 12 with a pixel to which attention is given, if attention is given to a pixel in the first row, it becomes difficult to appropriately select 16 pixels. Thus, it is assumed that the constant margin=2 in order to give attention to a pixel in the second row and after.

In step S23, the selection section 22A initializes a variable iwid, which counts the column number iwid of the pixel to which attention is given, to the constant margin.

In the same manner as the constant margin for the variable ihei, when 16 pixels having a positional relationship as shown in FIG. 12 with a pixel to which attention is given, if attention is given to a pixel in the first column, it becomes difficult to appropriately select 16 pixels. Thus, it is assumed that the constant margin =2 to give attention in order to a pixel in the second column and after.

In step S24, the selection section 22A selects 16 pixels (FIGS. 13 to 16) when attention is given to the pixel of the input image W in the ihei-th row and the iwid column from the input image W, and supplies it to the calculation section 22C.

In step S25, the calculation section 22C performs gamma correction on the pixel values of the 16 pixels supplied from the selection section 22A to convert the pixel values to the luminance values.

Figure 18:
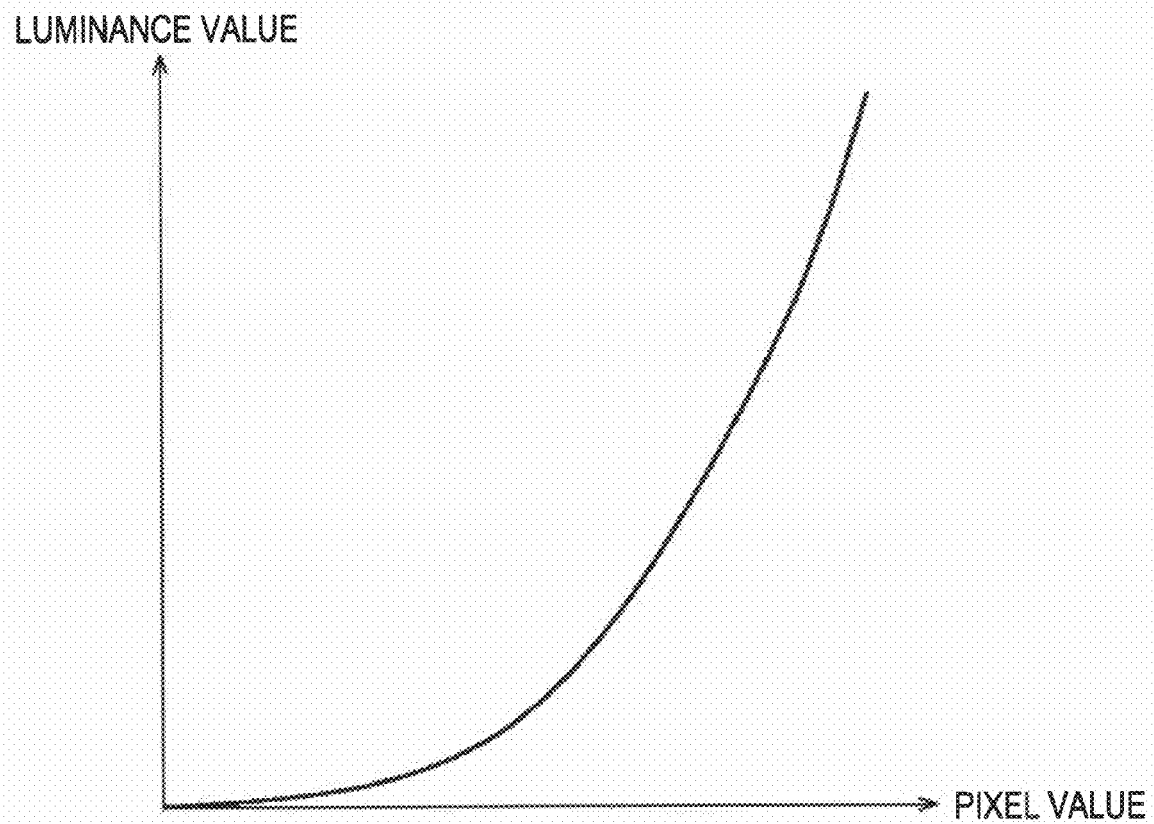
FIG. 18 is a graph illustrating a relationship between a pixel value and a luminance value.

The relationship between a pixel value and a luminance value is nonlinear as shown in FIG. 18, and thus it is necessary for the calculation section 22C to perform conversion from the pixel value to the luminance value before performing inversely corresponding calculation.

Assuming that the pixel value of the pixel to be converted is v, and the luminance value (the luminance value on the projection plane 13) of the pixel is I, the luminance value I is generally expressed as $I=v^\gamma$ using the pixel value v. Here, $\gamma$ is a predetermined constant. The pixel value is converted into a luminance value by performing the gamma correction using this expression.

Referring back to FIG. 17, in step S26, the calculation section 22C performs the inversely corresponding calculation using the luminance value of the inversely corresponding pixel and the inversely corresponding coefficient (that is to say, the thirteenth-row coefficient of the generalized inverse matrix $M^{-1}$) stored in the coefficient storage section 22B to obtain the luminance value of the corresponding pixel. The calculation section 22C performs inverse gamma correction on the obtained luminance value of the corresponding pixel to convert the luminance value into the pixel value. The pixel value v is expressed as $v=I^{1/\gamma}$ using the luminance value. The luminance value is converted into a pixel value by performing inverse gamma correction using this expression.

In this regard, here, the calculation section 22C performs clip processing, in which if the pixel value of the corresponding pixel is 0 or less, 0 is obtained, if the pixel value is 256 or more, 255 is obtained, and if the pixel value is other than these, the value without change is obtained.

Next, in step S27, the calculation section 22C determines the phase image Q and the position thereof, which are constituted by the corresponding pixel whose luminance value is obtained in step S26 as described with reference to FIGS. 13 to 16.

That is to say, if the variable iwid and the variable ihei are both even, the corresponding pixel becomes a pixel of the phase image Q1. If the variable iwid is odd and the variable ihei is even, the corresponding pixel becomes a pixel of the phase image Q2. If the variable iwid and the variable ihei are both odd, the corresponding pixel becomes a pixel of the phase image Q3. If the variable iwid is even and the variable ihei is odd, the corresponding pixel becomes a pixel of the phase image Q4.

Also, the position of the phase image Q of the corresponding pixel is determined by Expression (4).

Next, in step S28, the selection section 22A increments the variable iwid by 1, and determines whether the variable iwid after the increment is less than the difference when the constant margin is subtracted from the constant width expressing the number of pixels of the input image W in the width direction.

In step S28, if it is determined that the variable iwid after the increment is less than the difference when the constant margin is subtracted from the constant width, the processing returns to step S24, and the same processing is repeated in the following.

On the other hand, in step S28, if it is determined that the variable iwid after the increment is not less than the difference when the constant margin is subtracted from the constant width, the inversely corresponding calculation of the ihei-th row is completed, and the processing proceeds to step S29.

In step S29, the selection section 22A increments the variable ihei by 1, and determines whether the variable ihei after the increment is less than the difference when the constant margin is subtracted from the constant height expressing the number of pixels of the input image W in the longitudinal direction.

In step S29, if it is determined that the variable ihei after the increment is less than the difference when the constant margin is subtracted from the constant height, the processing returns to step S23, the same processing is repeated in the following, and the inversely corresponding calculation is performed on the next row.

On the other hand, in step S29, if it is determined that the variable ihei after the increment is not less than the difference when the constant margin is subtracted from the constant height, the inversely corresponding calculation on the input image W of the color corresponding to the variable iband is completed, and the processing proceeds to step S30.

In step S30, the selection section 22A increments the variable iband by 1, and determines whether the variable iband after the increment is less than a constant nband indicating the total number of color types of the input image W.

In step S30, if it is determined that the variable iband after the increment is less than the variable nband, the processing returns to step S22, the same processing is repeated in the following, and the inversely corresponding calculation is performed for the input image W of the next color.

On the other hand, in step S30, if it is determined that the variable iband after the increment is not less than the variable nband, that is to say, the inversely corresponding calculation on the input image W for individual colors of all the color types is completed and a plurality of phase images Q for all the color types are generated, and the processing proceeds to step S31.

In step S31, the calculation section 22C supplies the generated (all the color types of) plurality of phase images Q to the distribution section 23, and the distribution section 23 supplies the phase images Q supplied from the image processing section 22 to the corresponding projector 12.

The processing as described above is repeated for each input of the input image W.

Figure 19:
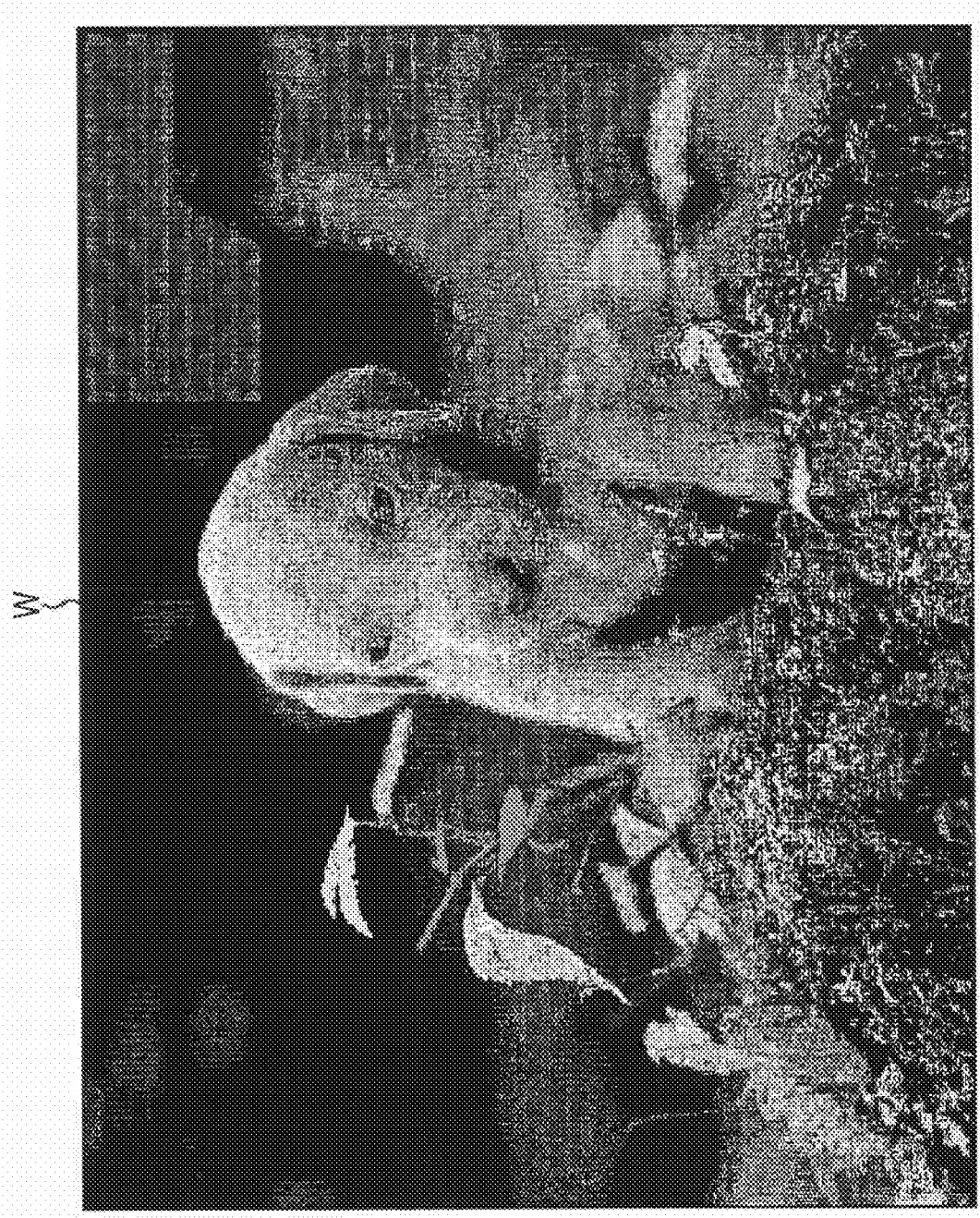
FIG. 19 is a view illustrating an input image W.
Figure 20:
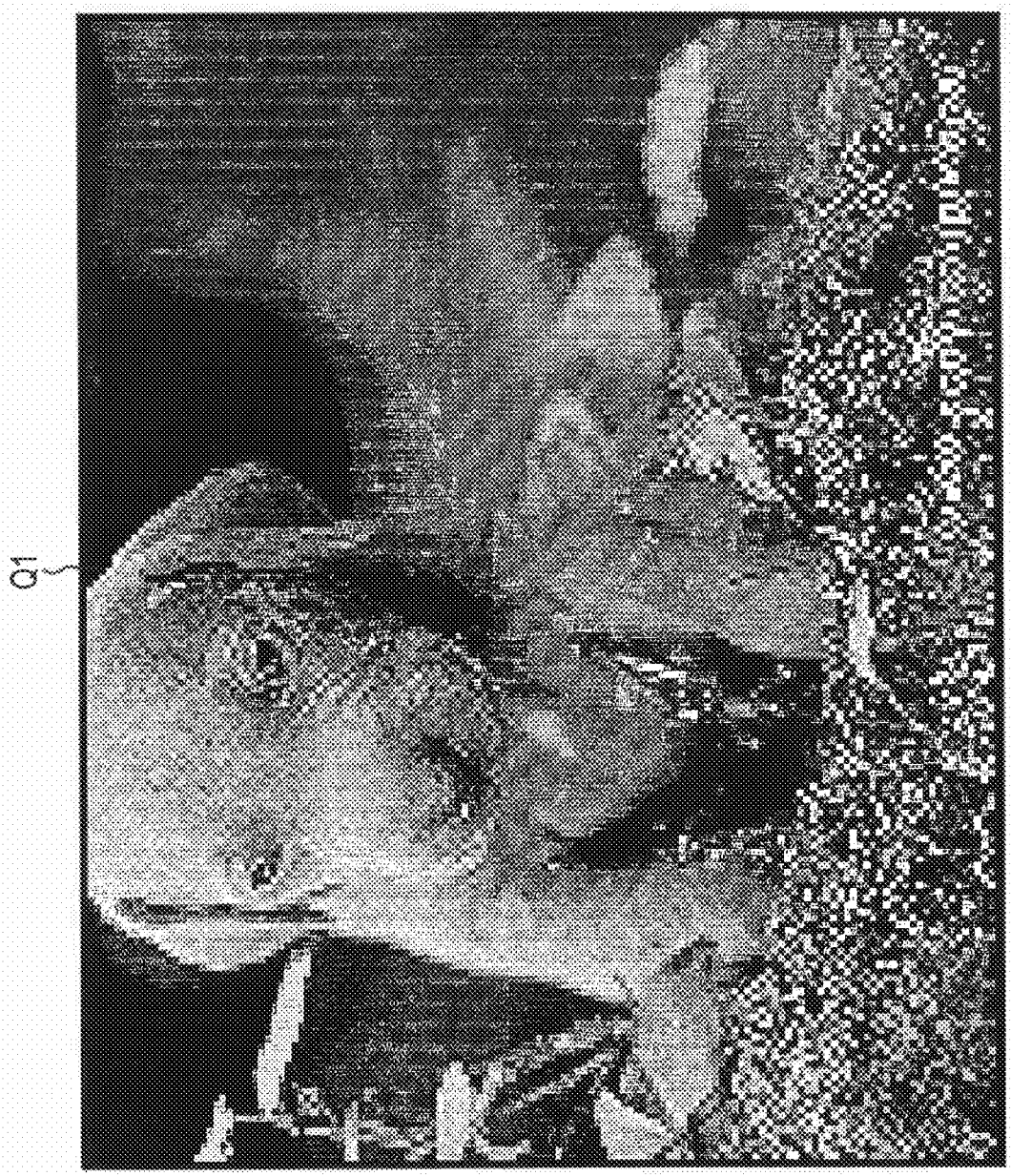
FIG. 20 is a view illustrating part of a phase image Q1.
Figure 21:
FIG. 21 is a view illustrating part of a phase image Q2.
Figure 22:
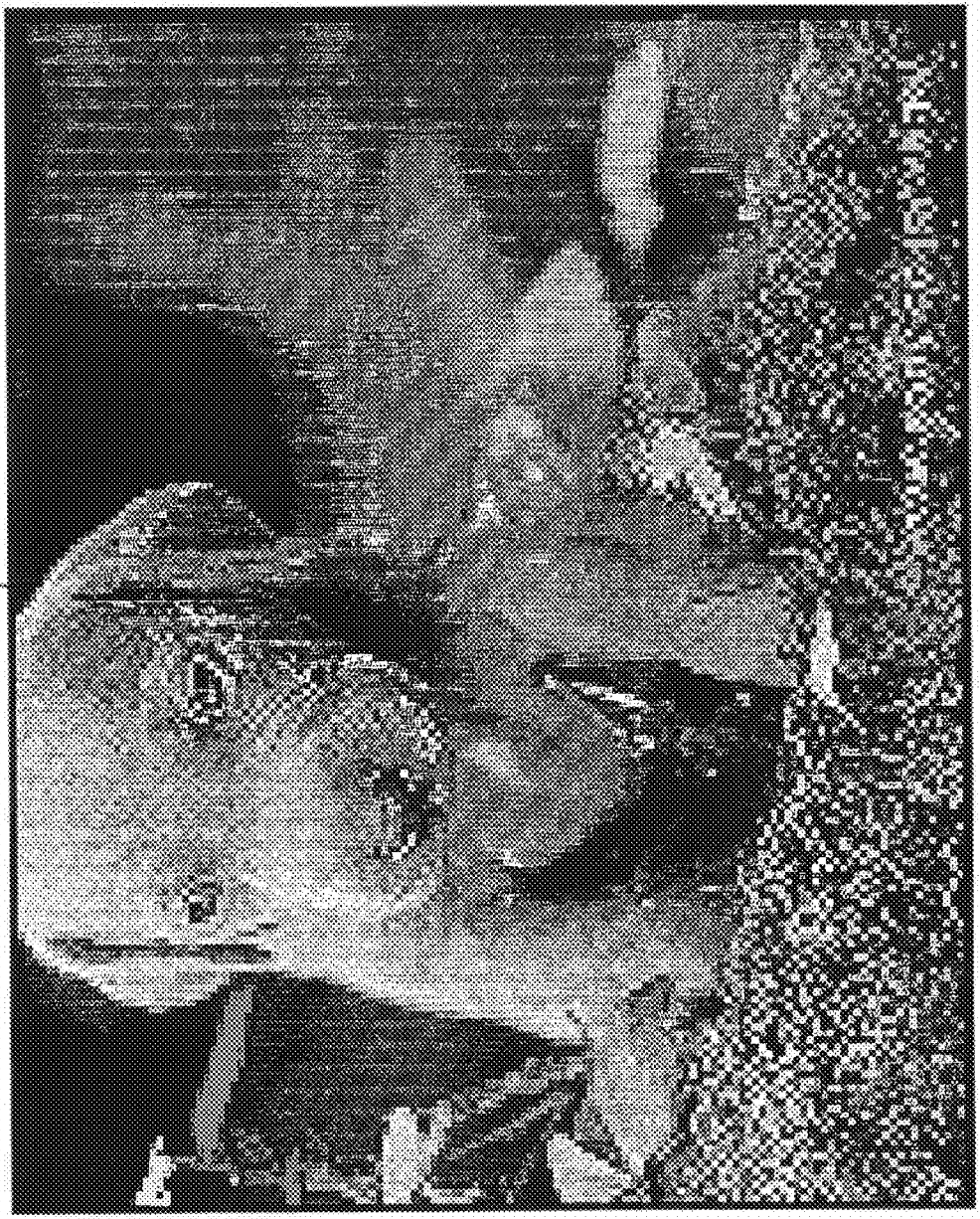
FIG. 22 is a view illustrating part of a phase image Q3.
Figure 23:
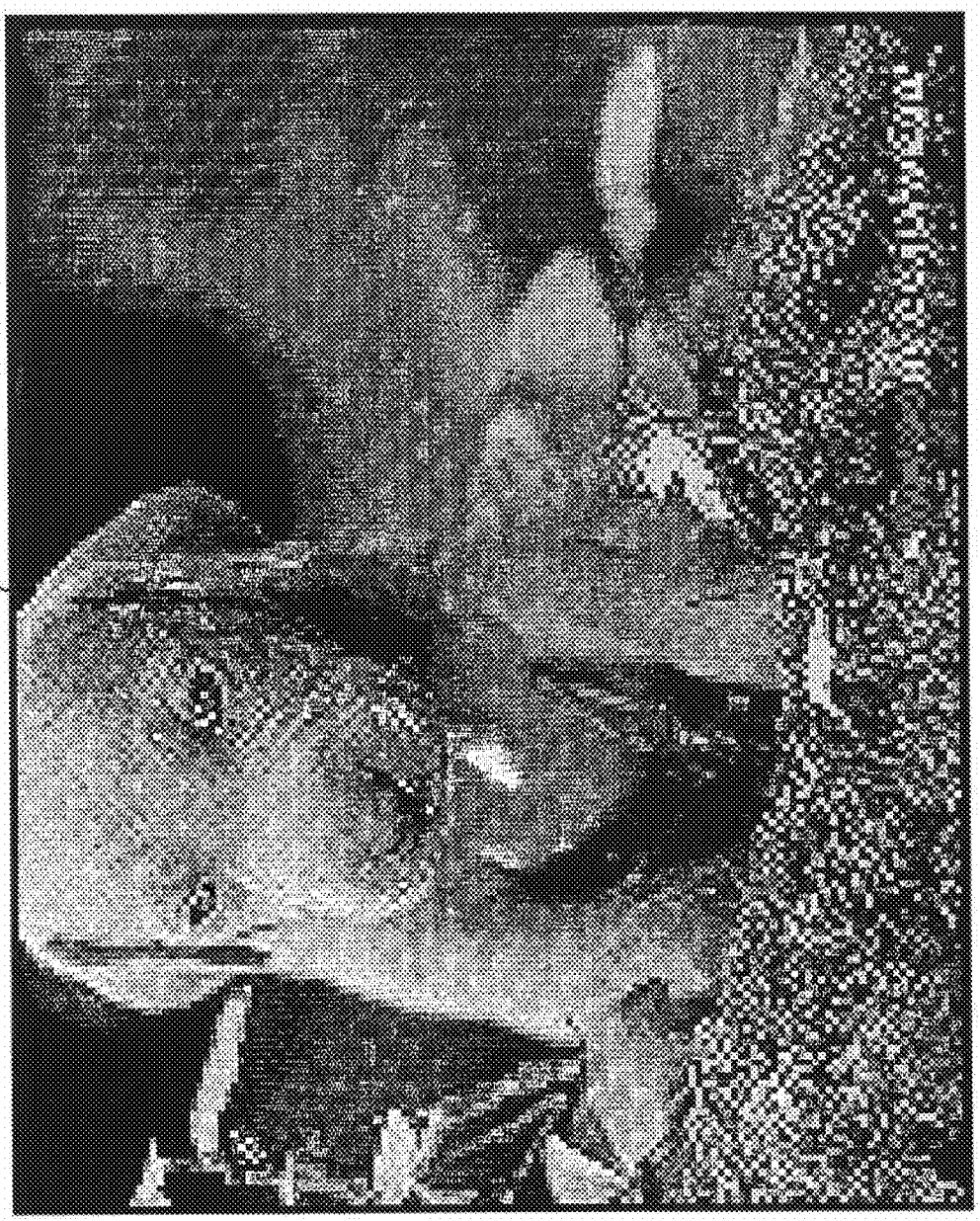
FIG. 23 is a view illustrating part of a phase image Q4.

Next, with reference to FIGS. 20 to 24, a description will be given of a trial example of an image projection system 1 of FIG. 3 when the input image W shown in FIG. 19 is input.

Figure 24:
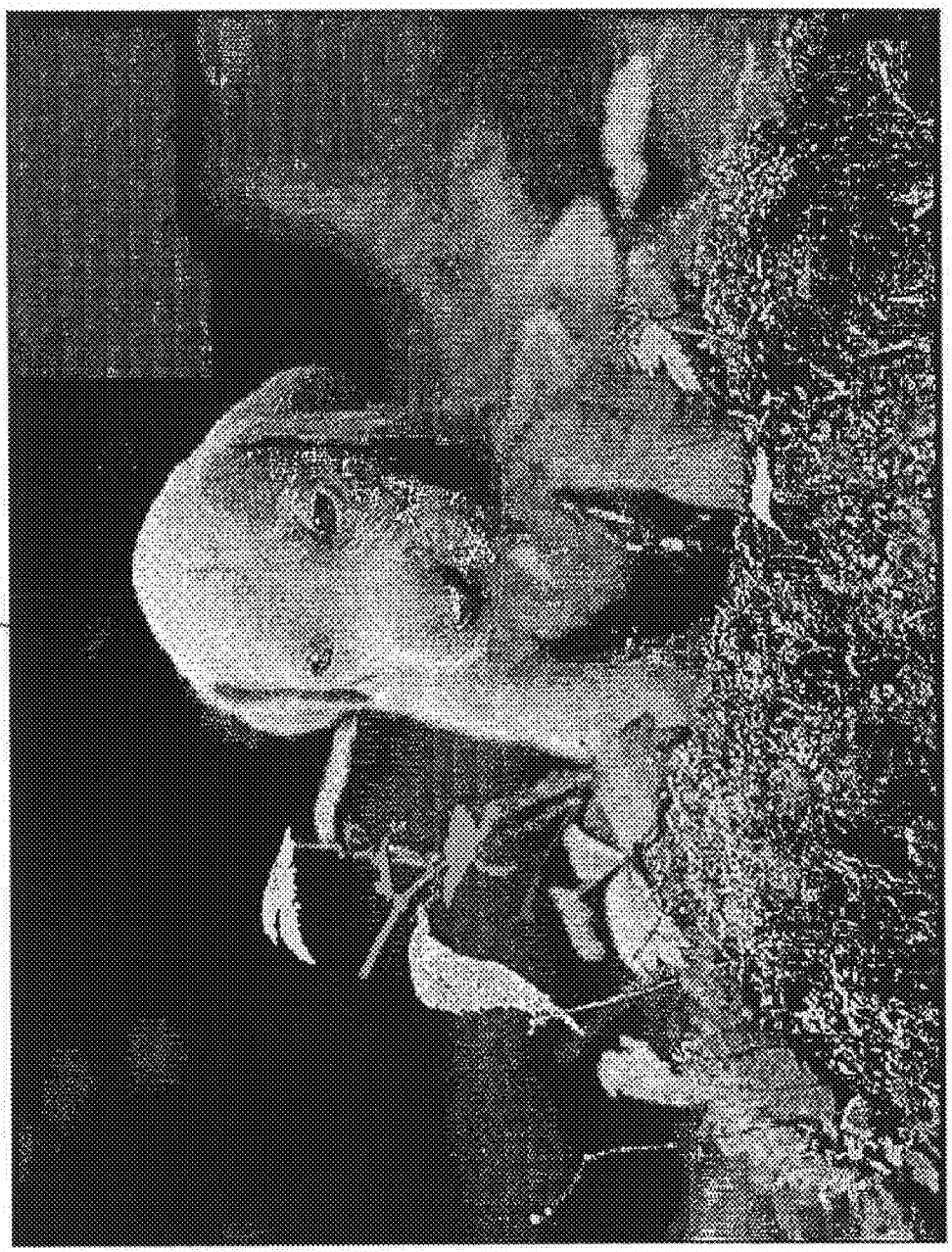
FIG. 24 is a view illustrating a projected image Z.

In this trial, in the image processing unit 11, the phase images Q1 to Q4, shown in FIGS. 20 to 23, having a resolution one half the resolution of the input image W are generated, and the projectors 12A to 12D project the phase images Q1 to Q4 such that the phase images Q1 to Q4 are overlapped each other with a shift of a half of a pixel of the phase image Q individually in the vertical and the horizontal directions. As shown in FIG. 24, a projection image Z having the same resolution as that of the input image W and the same image quality as that of the input image W was projected onto the projection plane 13.

As described above, when a plurality of phase images Q generated from the input image W are projected onto the projection plane 13 such that the plurality of phase images Q overlap each other with a predetermined amount of shift, an area formed by overlapping a predetermined pixel of the plurality of phase images Q individually and a pixel of the input image W are related, and the luminance value of a pixel of the phase images Q having a smallest difference between a luminance value of the corresponding area and a luminance value of a pixel of the input image is calculated. Accordingly, as the trial example in FIG. 24, it is possible to project a projection image Z, onto the projection plane 13, having the same resolution as that of the input image W and the same image quality as that of the input image W.

In this regard, in the above, four phase images Q are generated, and are projected so as to be overlapped each other. However, if two phase images Q are projected so as to be overlapped each other, it is possible to relate an area formed on the projection plane to a pixel of the input image W, and to obtain the same effect as the case of four phase images Q. A description will be given of an example of the case of projecting two phase images Q so as to be overlapped each other.

Figure 25:
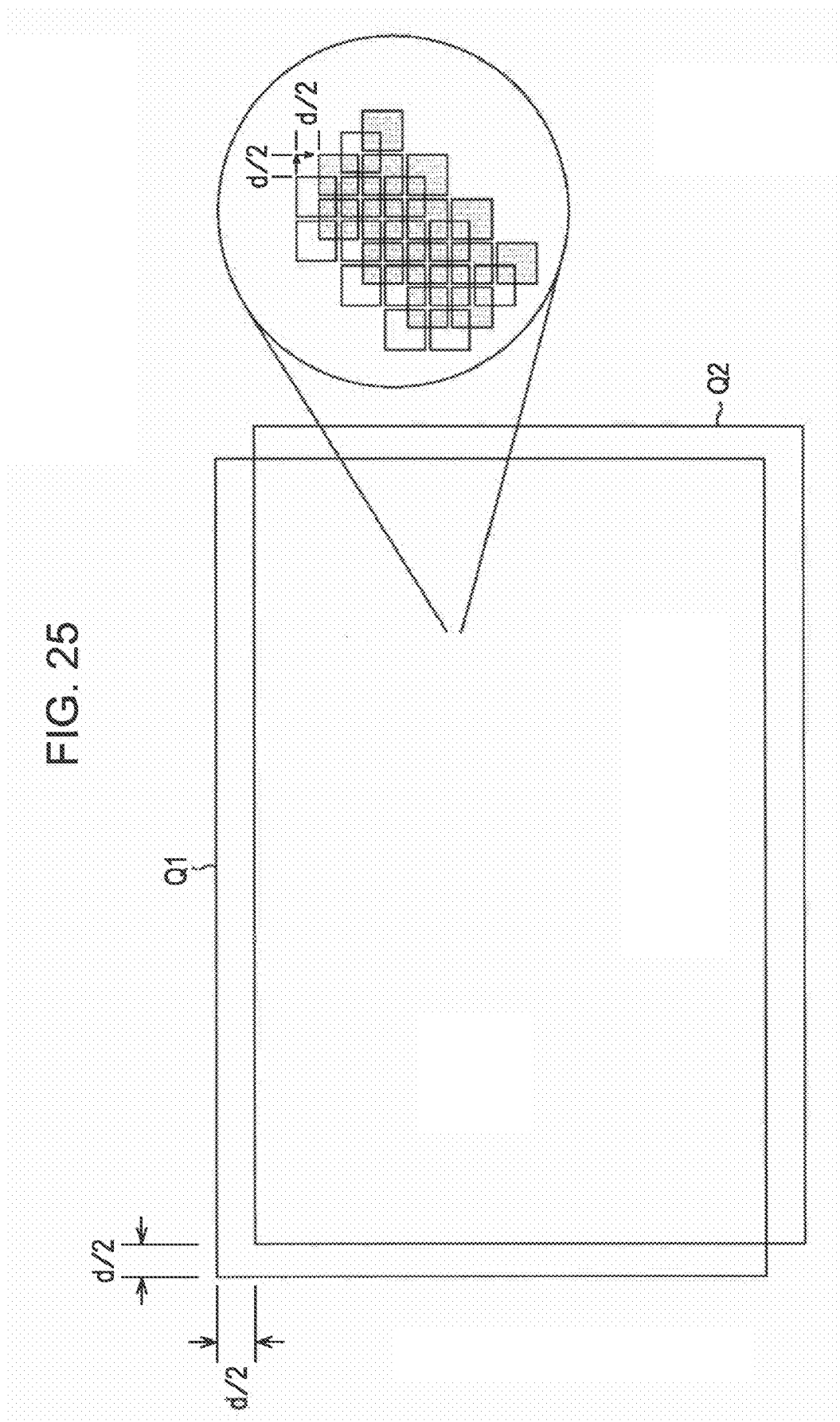
FIG. 25 is a diagram schematically illustrating two phase images.

In the case of this example, as shown in FIG. 25, two phase images Q1 and Q2 are projected so as to be sifted with a half of a pixel of the phase image Q in the vertical and the horizontal directions.

A description will be given of the generation processing of the phase images Q in the case of this example.

Figure 26:
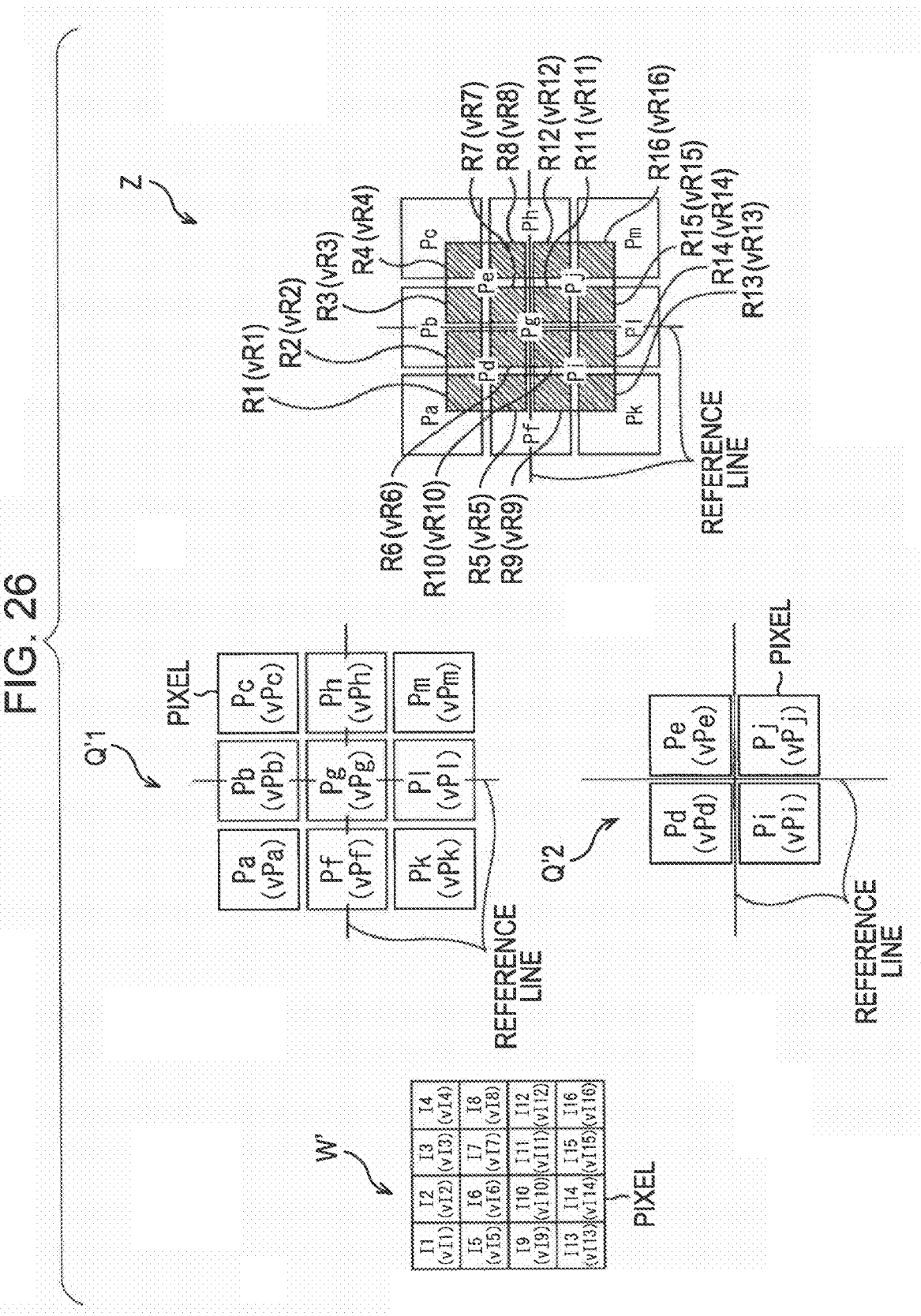
FIG. 26 is a diagram illustrating a principle of phase-image generation processing.

For example, as shown in FIG. 26, if two projection images Q'1 and Q'2 having a resolution one half the resolution of a predetermined image W' are projected such that the projection images overlap each other with a shift of a half of a pixel of the phase image individually in the vertical and the horizontal directions, that is to say, the projection images are projected such that the reference lines drawn in accordance with the projection images Q' match, areas R1 to R16 formed by an individually predetermined pixels P of the two projection images Q' overlapping are formed on the projection image Z obtained as a result.

The luminance values vR1 to vR16 of the areas R1 to R16 of the projection image Z are determined by the luminance values vP of the pixels P of the two projection images Q' overlapping each other.

For example, the area R1 is formed by a pixel Pa of the projection image Q'1 and a pixel Pd of the projection image Q'2 overlapping each other, and thus the luminance value vR1 of the area R1 becomes the sum of a luminance value vPa of the pixel Pa of the projection image Q'1 and a luminance value vPd of the pixel Pd of the projection image Q'2.

The area R6 is formed by a pixel Pg of the projection image Q'1 and a pixel Pd of the projection image Q'2 overlapping each other, and thus the luminance value vR6 of the area R6 becomes the sum of a luminance value vPg of the pixel Pg of the projection image Q'1 and a luminance value vPd of the pixel Pd of the projection image Q'.

Also, the projection images Q' are projected such that individual images overlap each other with a shift of one-half the size of a pixel in the vertical and the horizontal directions, and thus the size of the area R becomes one fourth the size of the pixel P. That is to say, the size of the area R becomes the size of the pixels I of the image W' having a resolution two time the resolution of the projection images Q'.

Accordingly, from the above, if the luminance value vP of the pixel P of each projection image Q' is determined such that the luminance values vR1 to vR16 of the areas R1 to R16 become the luminance values vI1 to vI16 of the pixels I1 to I16 of the image W', it is possible to project a projection image Z having the same resolution as that of the image W' and having the same image quality as that of the image W' by projecting two projection images Q' overlapping each other with a shift of a half of a pixel of the projection image Q' individually in the vertical and the horizontal directions in the same manner as the case of using four projection images Q'.

Also, in the example of FIG. 26, a relationship between the luminance values vR of the area R and the luminance values vP of the pixels P of the projection image Q', in which the luminance values vR of the area R is the sum of individually predetermined luminance values vP of pixels P of the projection image Q'1 and the luminance values vP of pixels P of the projection image Q'2, can be expressed by a relational expression, as shown in FIG. 27, including a vector of the luminance values vR of the area R, a vector of the luminance values vP of pixels P of the projection image Q', and a predetermined 16×13 matrix M.

For example, if attention is given to the first row of the matrix M, the luminance values of the area R1 becomes vR1=vPa+vPd, which matches the above-described relationship.

Thus, the individual areas R1 to R16 are related to predetermined pixels I of the image W', and the luminance values vR of the areas R1 to R16 in this relational expression are determined to be the luminance values vI of the corresponding pixels I of the image W' as shown in FIG. 28. If the luminance values vP of the pixels P of the projection image Q'1 and Q'2 are solved, the luminance values vP of the pixels P of the projection image Q' such that the individual luminance values vR of the area R become the luminance values I of the corresponding pixels I of the image W' can be obtained.

Figure 29:
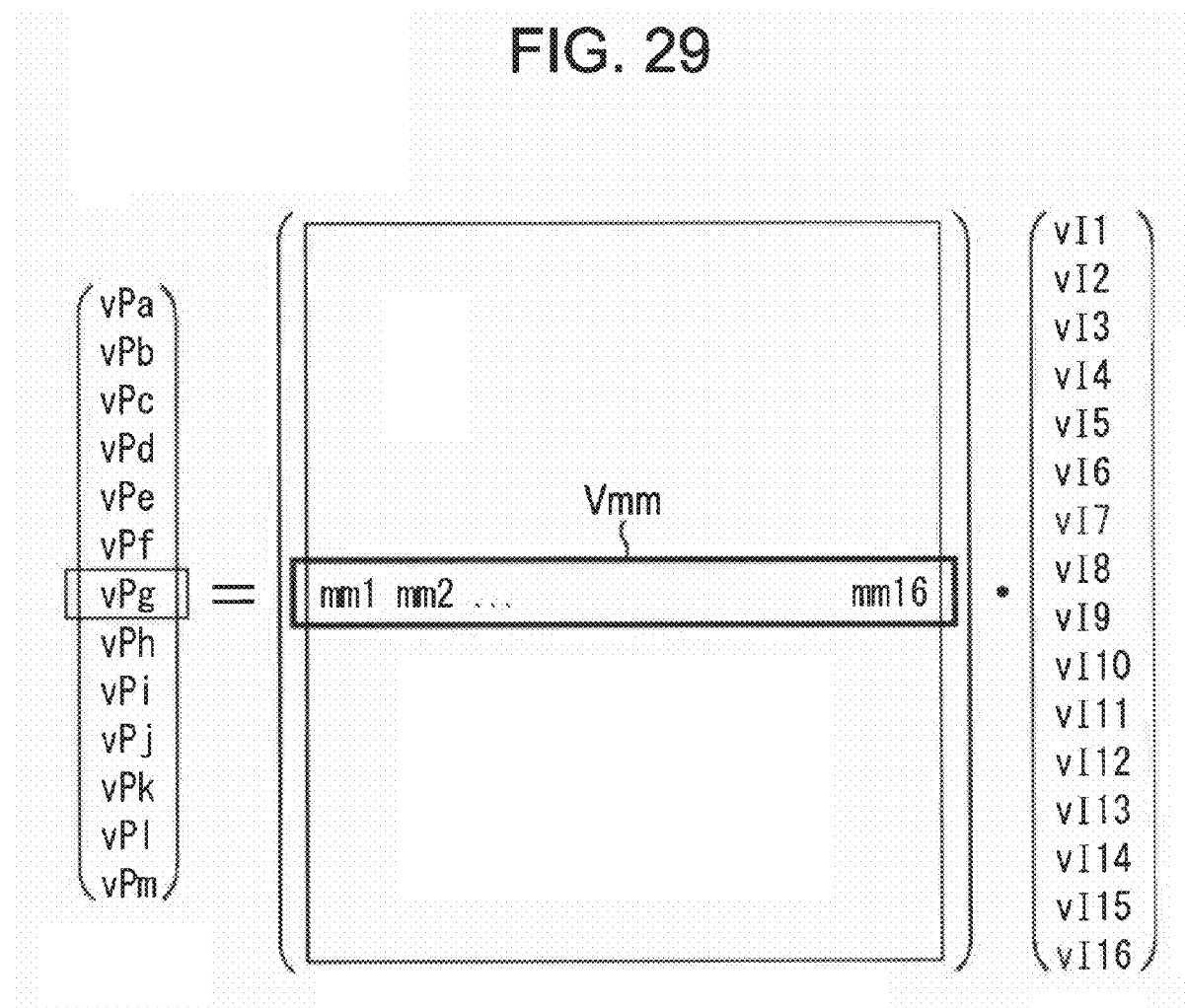
FIG. 29 is a diagram illustrating a relational expression expressing a vector of the luminance values vP of the projected image Q' by a vector of the luminance values vI of the image W'.

If the luminance values vP of the pixels P of the projection image Q' are solved from this relational expression in the same manner as the case of four projection image Q', as shown in FIG. 29, a relational expression expressing the vector of the luminance values vP of the projection image Q' can be obtained by the vector of the luminance values vI of the pixels I of the image W'.

By this relational expression, for example, in the example in FIG. 26, luminance values vPg of a pixel Pg of the projection image Q'1 related to the formation of the areas R6, R7, R10, and R11, which correspond to the four central pixels I6, I7, I10, and I11 of the 16 pixels I1 to I16 of the image W', is the inner product of the vector of the luminance values vI of the pixels I of the image W' and the row vector Vmm (the elements thereof are mm1, mm2, . . . , mm16) of the seventh row of the generalized inverse matrix $M^{-1}$, and thus can be obtained by Expression (5).

$$vPg = mm1 \cdot vI1 + mm2 \cdot vI2 + \ldots + mm16 \cdot vI16 \quad (5)$$

Figure 30:
FIG. 30 is a diagram illustrating a row vector of a seventh row of a generalized inverse matrix $M^{-1}$.

In this regard, the elements of the row vector of the seventh row of the generalized inverse matrix $M^{-1}$ becomes −0.0769, −0.0385, −0.0385, −0.0769, −0.0385, 0.2308, 0.2308, −0.0358, −0.0358, 0.2308, 0.2308, −0.0385, −0.0769, −0.0385, −0.0385 and −0.0769. These elements are shown in the figure by corresponding them to individual pixels I of the image W' as shown in FIG. 30.

That is to say, in the case of this example, the inner product of the luminance values of the 16 predetermined pixels read from the input image W and the row vector Vmm of the seventh row of the generalized inverse matrix $M^{-1}$ is obtained. Thus, the luminance value of the pixel (that is to say, a corresponding pixel) of the phase images Q related to the formation of the four areas corresponding to the four central pixels of the 16 read-out pixels (that is to say, the inversely corresponding pixels).

In this regard, also in this example, in order to simplify the calculation, the luminance value of the corresponding pixel is obtained using only the row vector Vmm of the seventh row of the generalized inverse matrix $M^{-1}$.

That is to say, 16 pixels (that is to say, the inversely corresponding pixel) are read from the input image W by shifting for each pixel in the vertical and the horizontal directions. The luminance values of the pixels (that is to say, the corresponding pixels) of the phase images related to the formation of the four areas corresponding to the four central pixels of the 16 pixels are obtained by the inner product of the luminance value vector and the row vector Vmm of the seventh row of the generalized inverse matrix $M^{-1}$.

As shown in the following, in which phase images Q the corresponding pixel is included, or its position on the phase image Q is determined so as to form overlap area appropriately.

For example, as shown in FIG. 12, 16 pixels are selected as an inversely corresponding pixel such that the input image W, to which attention is given, is located in the second row and the second column.

Figure 31:
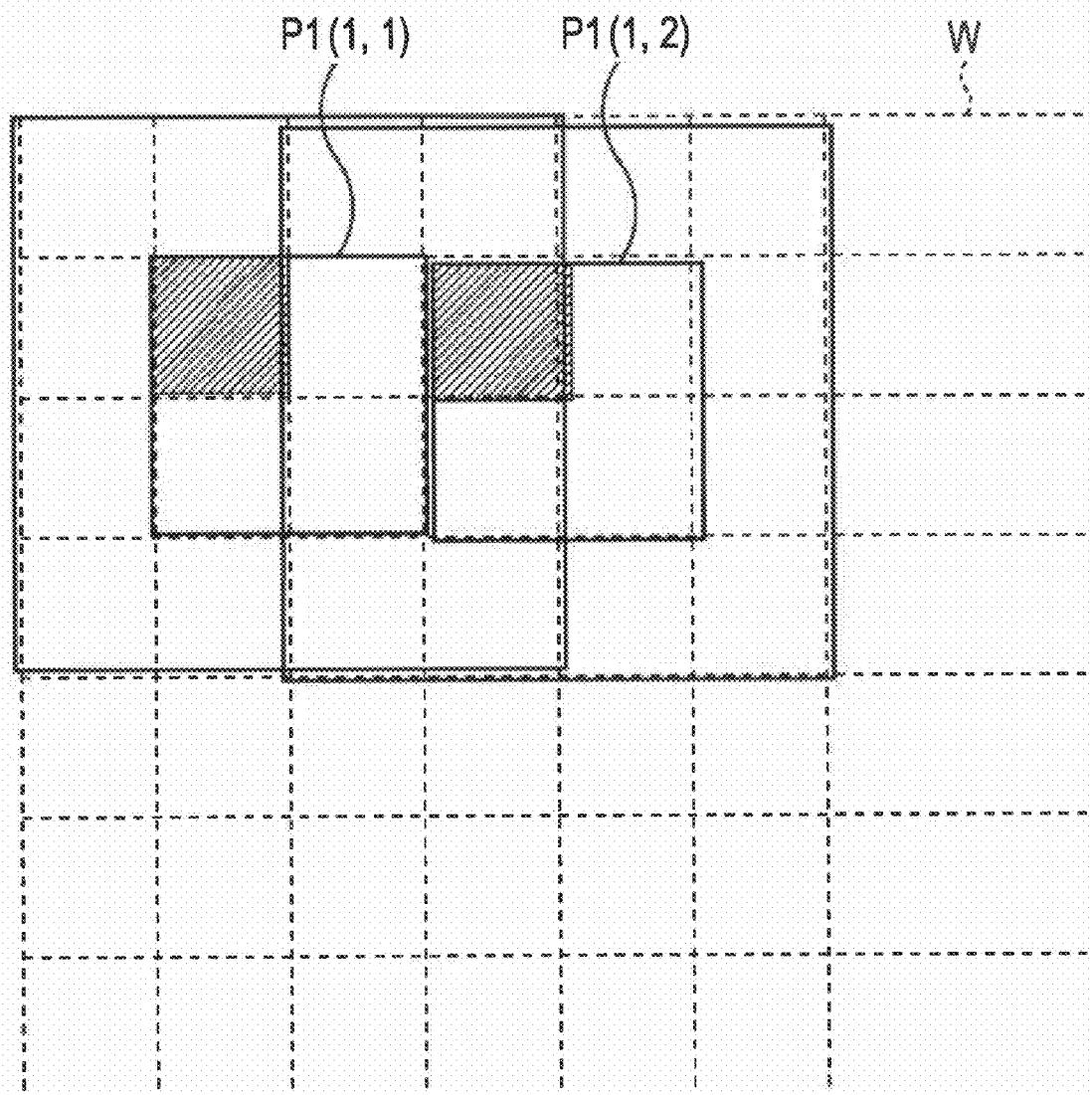
FIG. 31 is a diagram illustrating a state of determining phase images constituted by corresponding pixels.

As shown in FIG. 31, the corresponding pixel whose luminance value is calculated from the 16 inversely corresponding pixels selected when attention is given to pixels whose row number ihei is even, such as the pixel in the second row and the second column, the pixel in the second row and the fourth column, etc., of the input image W is determined to be a pixel of the phase image Q1, and is determined its column number x and row number y on the phase image Q by Expression (4).

For example, the column number x and the row number y of the corresponding pixel on the phase image Q1 whose luminance value is calculated from the 16 inversely corresponding pixels selected when attention is given to the pixel (the column number iwid=2 and the row number ihei=2) of the input image W become 1 (=floor (2/2)) and 1 (=floor (2/2)). Assuming that a pixel of the phase image Q1 is expressed as P1 (x, y) using the column number x and the row number y, this corresponding pixel becomes P1 (1, 1).

Figure 32:
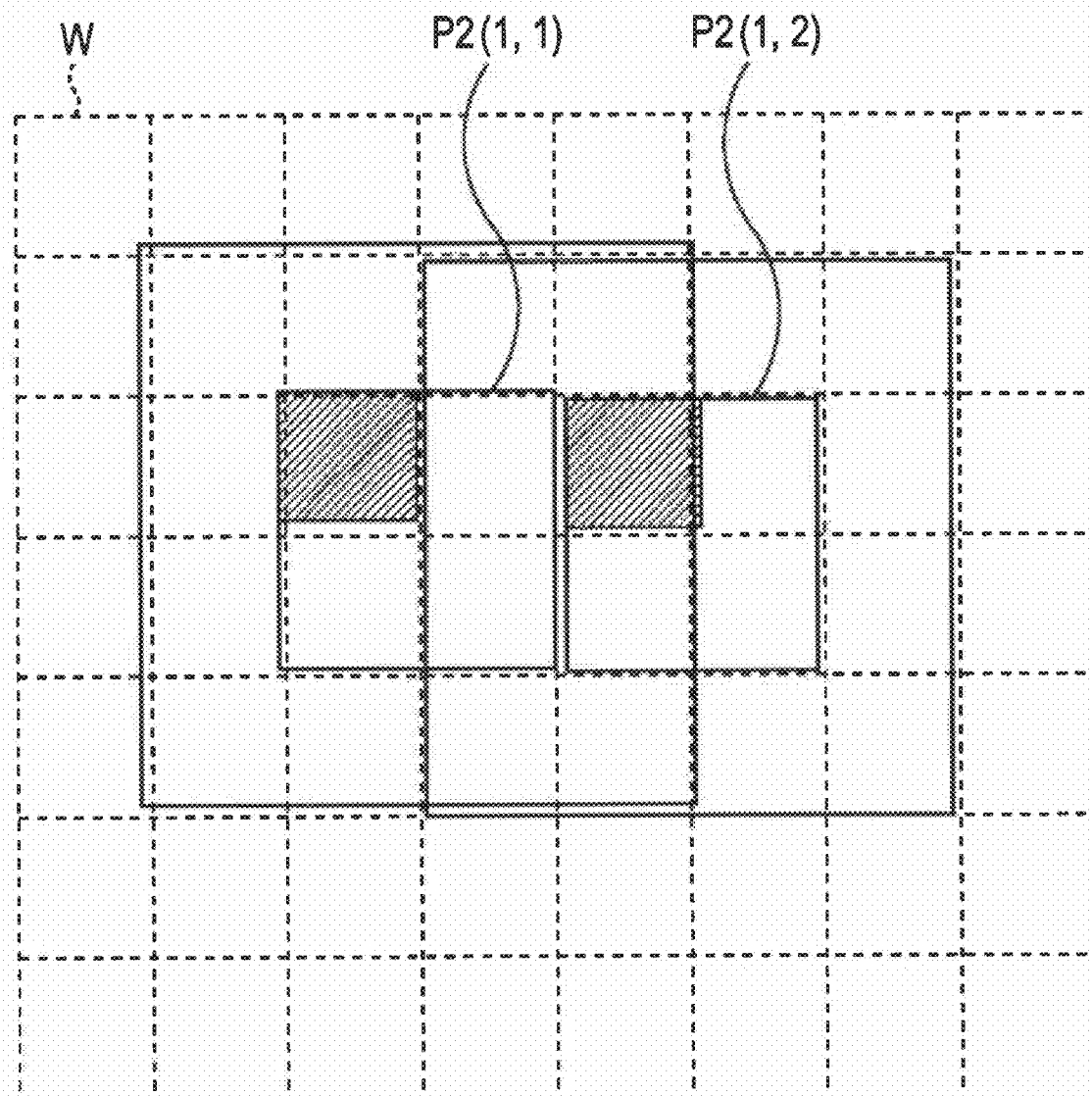
FIG. 32 is a diagram illustrating a state of determining phase images constituted by corresponding pixels.

As shown in FIG. 32, the corresponding pixel whose luminance value is calculated from the 16 inversely corresponding to pixels selected when attention is given to pixels whose row number ihei is odd, such as the pixel in the third row and in the third column, the pixel in the third row and in the fifth column, etc., of the input image W becomes a pixel of the phase image Q2.

For example, the column number x and the row number y of the corresponding pixel on the phase image Q2 whose luminance value is calculated from the 16 inversely corresponding pixels selected when attention is given to the pixel (the column number iwid=3 and the row number ihei=3) of the input image W become 1 (=floor (3/2)) and 1 (=floor (3/2)). Assuming that a pixel of the phase image Q2 is expressed as P2 (x, y) using the column number x and the row number y, this corresponding pixel becomes P2 (1, 1).

In this manner, the two phase images Q are generated.

That is to say, when two phase images Q are used, for example, only the projectors 12A and 12C are used among the projectors 12A to 12D in the image projection system 1 of FIG. 3. The image processing unit 11 supplies the two generated phase images Q to the projectors 12A and 12C as described above.

In this regard, it is also possible for the image processing section 22 of the image processing unit 11 to have stored individual inverse corresponding coefficients for the case of 4 phase images and for the case of 2 phase images in the coefficient storage section 22B, and to make it possible to perform the projection processing by either method.

In the above, in the image projection system 1 shown in FIG. 3, a plurality of phase images Q are projected simultaneously onto the projection plane 13 using a plurality of projectors 12. However, it is also possible to obtain the same effect as in the case of using a plurality of projectors by one projector 12 projecting a plurality of phase images in sequence at time intervals allowing obtaining that effect using time integration effect of a visual sense.

Figure 33:
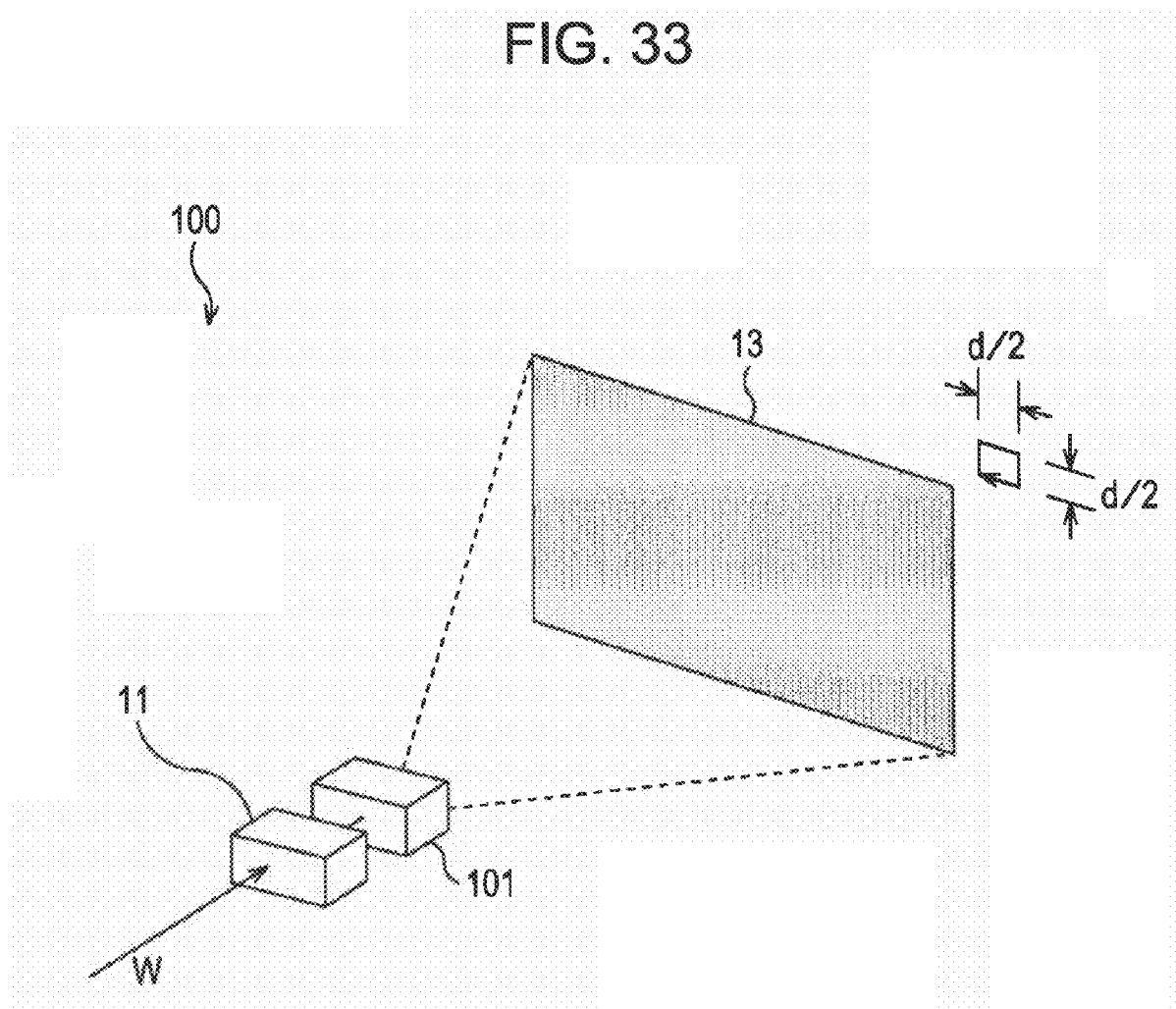
FIG. 33 is a block diagram illustrating an example of a configuration of an image projection system 100.

FIG. 33 illustrates an example of a configuration of an image projection system 100 in the case of using one projector.

That is to say, one projector 101 is provided in place of the four projectors 12 in FIG. 3.

An input image W having a resolution two times the resolution of the projection image projected by the projector 101 is input into the image processing unit 11.

In the same manner as the case of FIG. 3, the image processing unit 11 generates, for example 4 phase images, and supplies them to the projector 101.

The projector 101 projects the four phase images supplied from the image processing unit 11 in sequence onto the projection plane 13 such that the four phase images are overlapped each other with a shift of a half of a pixel of the phase image individually in the vertical and the horizontal directions (that is to say, with the amount of shift d/2 of one-half the vertical and horizontal size of a pixel assuming that the pixel pitch is d) as shown in FIG. 4. At the same time, the projector 101 projects the four phase images onto the projection plane 13 in sequence such that the four phase images are projected at time intervals allowing obtaining time integration effect of a visual sense.

That is to say, for the four phase images Q generated from the input image W, the projector 101 performs projection processing at time intervals allowing obtaining visual time integration effect such that a phase image Q1 is projected, after that, a phase image Q2 is projected to have the amount of shift d/2 from the phase image Q1 rightward, after that, a phase image Q3 is projected to have the amount of shift d/2 from the phase image Q2 downward, and after that, a phase image Q4 is projected to have the amount of shift d/2 from the phase image Q3 leftward.

In this manner, it is possible to project a projection image having the same resolution as that of the input image W and the same image quality as that of the input image W in the same manner as the case of using the four projectors 12 shown in FIG. 3 by projecting the four phase images supplied from the image processing unit 11 at time intervals allowing obtaining time integration effect of a visual sense.

Figure 34:
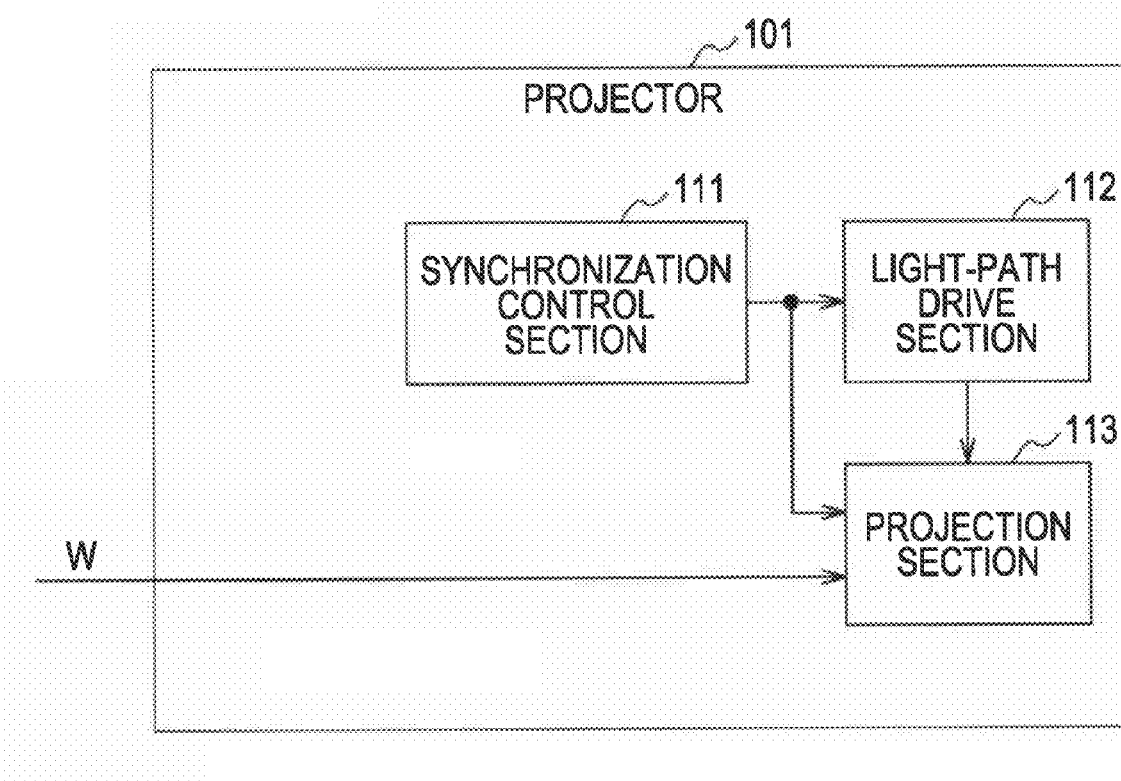
FIG. 34 is a block diagram illustrating an example of a configuration of a projector 101.

FIG. 34 is a block diagram illustrating an example of a configuration of the projector 101.

In FIG. 34, the projector 101 includes a synchronization control section 111, a light-path drive section 112, and a projection section 113.

The synchronization control section 111 generates a clock signal for synchronization, and supplies the signal to the light-path drive section 112 and the projection section 113.

The light-path drive section 112 drives the light path of the projection light of the projection section 113 such that phase images are projected with a shift of a half of a pixel of the phase image individually in the vertical and the horizontal directions in synchronism with the clock signal supplied from the synchronization control section 111.

The light-path drive section 112 includes, for example, a driver driving projection device itself of the projection section 113. Moreover, the light-path drive section 112 may dive a biaxial galvonometer mirror disposed on the light path of the projection light of the projection section 113.

The phase images Q supplied from the image processing unit 11 are supplied to the projection section 113.

The projection section 113 includes, for example, a reflective liquid crystal projector, etc., employing, for example a projection device projecting phase images Q at a frame rate of the product of the frame rate of the input image W and the number of phase images Q, for example a relatively high-speed LCOS (liquid crystal on silicon) having a response frequency of about 200 Hz. The projection section 113 projects the phase images Q supplied from the image processing section 22 in sequence in synchronism with the clock signal supplied from the synchronization control section 111 at time intervals visualizing the phase images Q so as to overlap each other with a predetermined amount of shift.

As described above, the image projection system 100 generates, from an input image, a plurality of phase images having lower resolutions than that of the input image. The image projection system 100 projects the plurality of phase images onto a projection plane in sequence at time intervals visualizing the phase images so as to overlap each other with a predetermined amount of shift by time integration effect of a visual sense. In the generation of the plurality of phase images, the image projection system 100 relates an area formed by overlapping a predetermined pixel of the plurality of phase images individually to a pixel of the input image, and calculates the luminance value of a pixel of the phase images having a smallest difference between a display of the corresponding area and a display of a pixel of the input image. Accordingly, the image projection system 100 can project a projection image having the same resolution as that of the input image and the same image quality as that of the input image.

Also, in the present embodiment, the higher the resolution is used for the input image W, the higher the resolution of the projection image Z can be improved.

In the present embodiment, the phase image has a resolution one half the resolution of the input image. However, the resolution may be 1/n (n is an integer) other than ½ in addition. In that case, it becomes possible to make the projection image n times the resolution effectively.

Also, in the image projection system 1 or the image projection system 100, a projector projecting a projection image having a lower resolution than the resolution of an input image is used, and thus it becomes possible to reduce cost of the system.

In the image projection system 1 and the image projection system 100, a relatively simple linear-prediction signal processing is performed as signal processing of inversely corresponding calculation. Thus, a relatively inexpensive existing signal processing circuit, such as a DSP (Digital Signal Processing), etc., can be used. Moreover, it is possible to achieve an image projection system without making a major change to the signal processing circuit.

In the image projection system 1 and the image projection system 100, a plurality of phase images are projected with being overlapped each other, and thus it is possible to improve a grayscale resolution from the original grayscale resolution of the projector as far as the multiplication of the number of projectors or the number of the phase images.

In the image projection system 1 or the image projection system 100, it becomes possible to produce a projection image having a higher image quality by using higher open area ratio of a pixel and higher luminance projection device, such as a high-luminance DLP, LCOS, etc.

The phase images Q generated by the image processing unit 11 may be recorded onto a recording medium, and may be supplied to a projector, such as the projector 12, etc.

The above-described series of processing can be executed by hardware or can be executed by software. When the series of processing is executed by software, the programs constituting the software are built in a dedicated hardware of a computer. Alternatively, the various programs are installed, for example in a general-purpose personal computer capable of executing various functions from a program recording medium.

Figure 35:
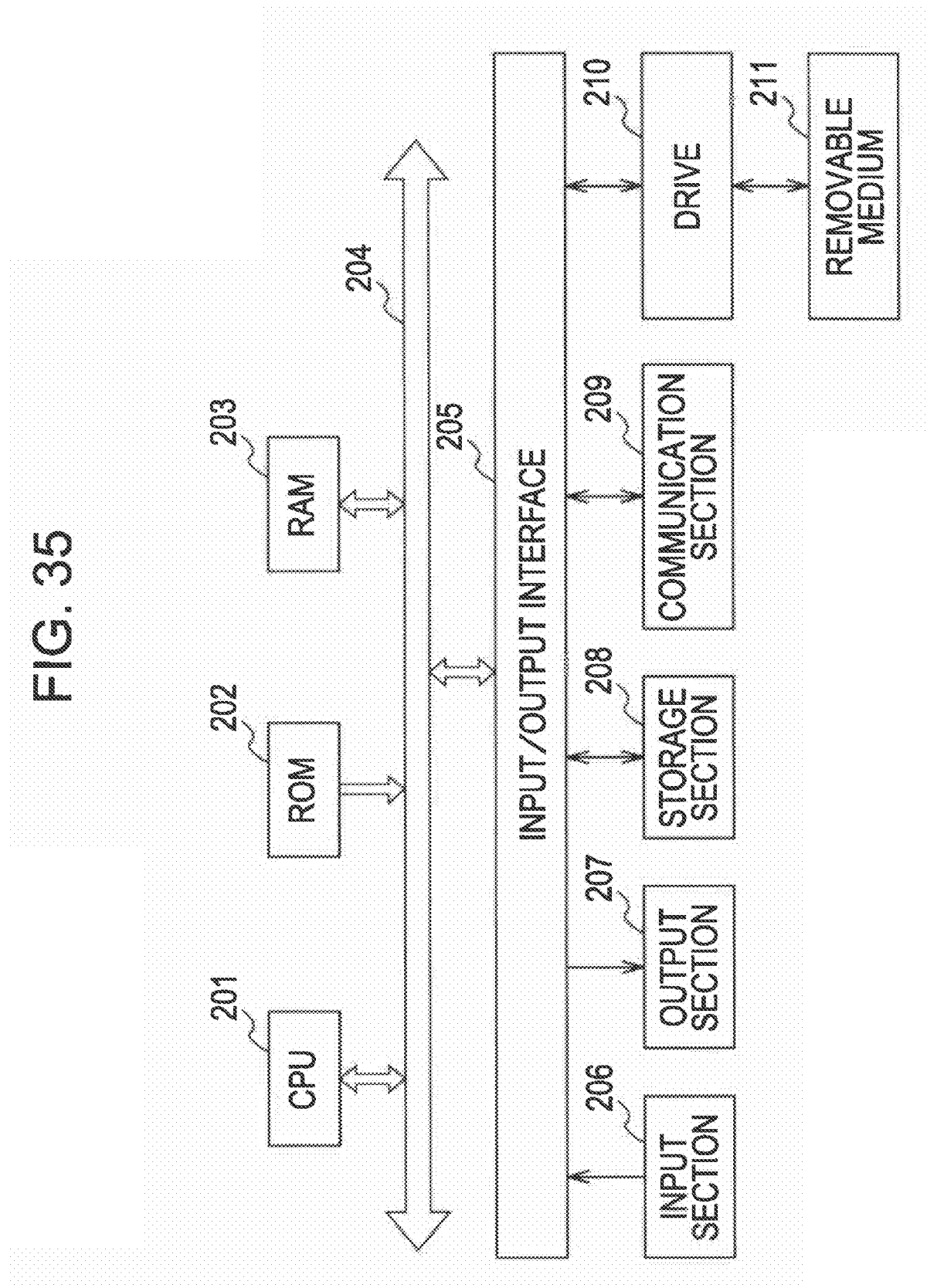
FIG. 35 is a block diagram illustrating an example of a configuration of a computer hardware to which the present invention is applied.

FIG. 35 is a block diagram illustrating an example of a configuration of a computer hardware performing the above-described series of processing.

In the computer, a CPU (Central Processing Unit) 201, a ROM (Read Only Memory) 202, a RAM (Random Access Memory) 203 are mutually connected by a bus 204.

An input/output interface 205 is also connected to the bus 204. An input section 206 including a keyboard, a mouse, a microphone, etc., an output section 207 including a display, a speaker, etc., a storage section 208 including a hard disk, a nonvolatile memory, etc., a communication section 209 including a network interface, etc., and a drive 210 for driving a removable medium, such as a magnetic disk, an optical disc, a magneto-optical disc, or a semiconductor memory, etc., are connected to the input/output interface 205.

In the computer having the configuration as described above, the CPU 201 loads the program stored, for example in storage section 208 to the RAM 203 through the input/output interface 205 and the bus 204 to execute the program, thereby the above-described series of processing is performed.

The program to be executed by the computer (CPU 201) is recorded in a removable medium 211, which is a package medium including, such as a magnetic disk (including a flexible disk), an optical disc (including a CD-ROM (Compact Disc-Read Only Memory), a DVD (Digital Versatile Disc), etc.), a magneto-optical disc, or a semiconductor memory, etc. Alternatively, the program may be provided through wired or wireless transmission, such as a local area network, the Internet, a digital satellite broadcasting, etc.

The program can be installed in the storage section 208 through the input/output interface 205 by attaching the removable medium 211 to the drive 210. Also, the program can be received by the communication section 209 through wired or wireless transmission and be installed in the storage section 208. In addition, the program may be pre-installed in the ROM 202 or the storage section 208 in advance.

In this regard, the program executed by the computer may be the program that is processed in time series in accordance with the described sequence in this specification. Also, the programs may be the programs to be executed in parallel or at necessary timing, such as at the time of being called, or the like.

In this regard, an embodiment of the present invention is not limited to the embodiments described above, and various modifications are possible without departing from the spirit and scope of the present invention.

What is claimed is:

1. An image generation apparatus for generating, from an input image, a plurality of phase images having lower resolutions than the input image and overlapping each other with a predetermined amount of shift when being projected onto a projection plane, the apparatus comprising
    when the plurality of phase images are projected onto the projection plane, means for relating an area formed by a predetermined pixel of the plurality of phase images overlapping individually to a predetermined pixel of the input image, and calculating a pixel value of a pixel of the phase images having a smallest difference between a pixel value of the corresponding area and a pixel value of a pixel of the input image.

2. The image generation apparatus according to claim 1, further comprising
    projection means for projecting the plurality of phase images onto the projection plane.

3. The image generation apparatus according to claim 2, wherein the projection means is a transmissive liquid crystal projector, a reflective liquid crystal projector, or a DLP (Digital Light Processing) projector.

4. The image generation apparatus according to claim 2, wherein the projection means of the same number as the phase images are provided, each of the plurality of generated phase images is supplied to the corresponding predetermined projection means, and each of the projection means projects the supplied phase image onto the projection plane such that the plurality of phase images overlap each other with a predetermined amount of shift.

5. The image generation apparatus according to claim 2, wherein one projection means is disposed, the plurality of generated images are supplied to the one projection means, and the projection means projects the plurality of phase images in sequence at time intervals visualizing the phase images such that the plurality of phase images overlap each other with a predetermined amount of shift by time integration effect of a visual sense.

6. A method of generating, from an input image, a plurality of phase images having lower resolutions than the input image and overlapping each other with a predetermined amount of shift when being projected onto a projection plane, the method comprising the steps of when the plurality of phase images are projected onto the projection plane, relating an area formed by a predetermined pixel of the plurality of phase images overlapping individually to a predetermined pixel of the input image, and calculating a pixel value of a pixel of the phase images having a smallest difference between a pixel value of the corresponding area and a pixel value of a pixel of the input image.

7. A computer readable storage device having instructions stored therein that when executed by a computer processor cause a computer to perform image generation processing for generating, from an input image, a plurality of phase images having lower resolutions than the input image and overlapping each other with a predetermined amount of shift when being projected onto a projection plane, the processing comprising the steps of, when the plurality of phase images are projected onto the projection plane, relating an area formed by a predetermined pixel of the plurality of phase images overlapping individually to a predetermined pixel of the input image, and calculating a pixel value of a pixel of the phase images having a smallest difference between a pixel value of the corresponding area and a pixel value of a pixel of the input image.

8. A recording medium recording the phase image generated by the image generation apparatus according to claim 1.

9. An image generation apparatus for generating, from an input image, a plurality of phase images having lower resolutions than the input image and overlapping each other with a predetermined amount of shift when being projected onto a projection plane, the apparatus comprising when the plurality of phase images are projected onto the projection plane, a mechanism for relating an area formed by a predetermined pixel of the plurality of phase images overlapping individually to a predetermined pixel of the input image, and calculating a pixel value of a pixel of the phase images having a smallest difference between a pixel value of the corresponding area and a pixel value of a pixel of the input image.

\* \* \* \* \*